(12) United States Patent
Tsuda et al.

(10) Patent No.: US 10,279,795 B2
(45) Date of Patent: May 7, 2019

(54) CONTROL DEVICE

(71) Applicant: AISIN AW CO., LTD., Anjo-shi, Aichi-ken (JP)

(72) Inventors: Kohei Tsuda, Nishio (JP); Takashi Yoshida, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 89 days.

(21) Appl. No.: 15/555,016

(22) PCT Filed: Mar. 31, 2016

(86) PCT No.: PCT/JP2016/060674
§ 371 (c)(1),
(2) Date: Aug. 31, 2017

(87) PCT Pub. No.: WO2016/159241
PCT Pub. Date: Oct. 6, 2016

(65) Prior Publication Data
US 2018/0056969 A1 Mar. 1, 2018

(30) Foreign Application Priority Data

Mar. 31, 2015 (JP) ................. 2015-071969

(51) Int. Cl.
*B60W 10/11* (2012.01)
*B60K 6/48* (2007.10)
(Continued)

(52) U.S. Cl.
CPC ............... *B60W 10/11* (2013.01); *B60K 6/48* (2013.01); *B60K 6/547* (2013.01); *B60L 11/14* (2013.01); *B60L 15/20* (2013.01); *B60W 10/08* (2013.01); *B60W 10/10* (2013.01); *B60W 20/00* (2013.01); *Y02T 10/645* (2013.01); *Y02T 10/70* (2013.01); *Y02T 10/7077* (2013.01); *Y02T 10/7275* (2013.01)

(58) Field of Classification Search
CPC ....................................................... B60L 15/20
See application file for complete search history.

(56) References Cited

U.S. PATENT DOCUMENTS 8,903,585 B2 * 12/2014 Tanishima ............... B60K 6/48
701/22
9,988,039 B2 * 6/2018 Brusberg ................ B60L 11/14
(Continued)

FOREIGN PATENT DOCUMENTS

JP   2012-86738 A   5/2012
JP   2013-47062 A   3/2013
(Continued)

OTHER PUBLICATIONS

Jun. 28, 2016 Search Report issued in International Patent Application No. PCT/JP2016/060674.

*Primary Examiner* — Derek D Knight
(74) *Attorney, Agent, or Firm* — Oliff PLC

(57) ABSTRACT

A control device for controlling a vehicle drive system in which a first engagement device, a rotating electric machine, and a second engagement device are provided in a power transfer path connecting an internal combustion engine to wheels and are arranged sequentially from an internal combustion engine side, the control device including an electronic control unit.

7 Claims, 6 Drawing Sheets

(51) Int. Cl.
*B60K 6/547* (2007.10)
*B60L 11/14* (2006.01)
*B60L 15/20* (2006.01)
*B60W 10/08* (2006.01)
*B60W 10/10* (2012.01)
*B60W 20/00* (2016.01)

(56) References Cited

U.S. PATENT DOCUMENTS 10,071,653 B2 * 9/2018 Meyer .................. B60L 11/123
2008/0017427 A1 * 1/2008 Nakanowatari ........ B60K 6/365
                                                                                 180/65.235

FOREIGN PATENT DOCUMENTS

WO      2012/114472 A1    8/2012
WO      2014/103962 A1    7/2014

* cited by examiner

|  | C1 | C2 | C3 | B1 | B2 | F |
|---|---|---|---|---|---|---|
| Rev |  |  | O |  | O |  |
| 1st | O |  |  |  | (O) | △ |
| 2nd | O |  |  | O |  |  |
| 3rd | O |  | O |  |  |  |
| 4th | O | O |  |  |  |  |
| 5th |  | O | O |  |  |  |
| 6th |  | O |  | O |  |  |

CONTROL DEVICE

BACKGROUND

The present disclosure relates to a control device for controlling a vehicle drive system in which a first engagement device, a rotating electric machine, and a second engagement device are provided in a power transfer path connecting an internal combustion engine to wheels and are arranged sequentially from the internal combustion engine side.

Japanese Patent Application Publication No. 2013-47062 discloses a control device such as the one described above. Japanese Patent Application Publication No. 2013-47062 discloses a technique for reducing shock caused by a reversal of the direction of a torque transferred to wheels while a vehicle travels on the torque of a rotating electric machine transferred to the wheels alone. Specifically, for a structure that starts an internal combustion engine when travel power that the vehicle needs reaches or exceeds a threshold value, the threshold value is set greater than a value optimized in terms of fuel economy of the internal combustion engine so that the internal combustion engine gets hard to start. This is intended to reduce the shock by making it less likely that when the vehicle changes from a deceleration state to an acceleration state, the timing of when the direction of the torque transferred to the wheels is reversed will coincide with the timing of when the internal combustion engine is started, which causes a sudden increase in the torque transferred to the wheels.

SUMMARY

However, the problem with the structure of Japanese Patent Application Publication No. 2013-47062 is that the timing of when an internal combustion engine is started is delayed.

An exemplary aspect of the present disclosure realizes a control device for reducing shock that is transferred to wheels upon reversal of the direction of a required torque that is required to be transferred to the wheels, without staggering the timing of when the direction of the required torque is reversed and the timing of when an internal combustion engine is started.

In view of the above, an exemplary control device for controlling a vehicle drive system in which a first engagement device, a rotating electric machine, and a second engagement device are provided in a power transfer path connecting an internal combustion engine to wheels and are arranged sequentially from the internal combustion engine side includes an electronic control unit that is configured to, during start control that starts the internal combustion engine, bring the second engagement device into a slip engagement state and perform slip control that controls the rotating electric machine to maintain a state where there is a difference in rotational speed between a pair of engagement members of the second engagement device; a rotational speed of the rotating electric machine at which there is no difference in rotational speed between the pair of engagement members of the second engagement device is defined as a synchronous rotational speed; and the electronic control unit performs the slip control to maintain the rotational speed of the rotating electric machine at a rotational speed higher than the synchronous rotational speed when an accelerator operation amount decreases under a condition where the rotational speed of the rotating electric machine is higher than the synchronous rotational speed.

According to the exemplary structure described above, the slip control maintains the second engagement device in the slip engagement state during the start control that starts the internal combustion engine. This makes it hard to transfer, to the wheels, fluctuation in output torque of the internal combustion engine and torque fluctuation caused by a change in the state of engagement of the first engagement device, thus reducing shock associated with starting the internal combustion engine. In addition, according to the exemplary structure described above, when the accelerator operation amount decreases under the condition where the rotational speed of the rotating electric machine is higher than the synchronous rotational speed, the rotational speed of the rotating electric machine is maintained at the rotational speed higher than the synchronous rotational speed. Since there is an overall trend that a required torque that is a torque required to be transferred to the wheels via the second engagement device becomes smaller as the accelerator operation amount becomes smaller, the required torque may change from a positive torque to a negative torque when the accelerator operation amount decreases under the condition where the rotational speed of the rotating electric machine is higher than the synchronous rotational speed. Therefore, in contrast to the structure described above, in the case where the control for maintaining the rotational speed of the rotating electric machine at the rotational speed higher than the synchronous rotational speed is not performed when the accelerator operation amount decreases under the condition where the rotational speed of the rotating electric machine is higher than the synchronous rotational speed, if the required torque changes from the positive torque to the negative torque in response to the decrease in the accelerator operation amount, a transition occurs, in response to the change in the required torque, from a state where the rotational speed of the rotating electric machine is higher than the synchronous rotational speed to a state where the rotational speed of the rotating electric machine is lower than the synchronous rotational speed. Further, since the direction in which the second engagement device transfers a torque is reversed at a time when a magnitude relationship between the rotational speed of the rotating electric machine and the synchronous rotational speed is reversed, shock corresponding to the transfer torque capacity of the second engagement device at the time may occur. On the other hand, if the rotational speed of the rotating electric machine is maintained at the rotational speed higher than the synchronous rotational speed when the accelerator operation amount decreases under the condition where the rotational speed of the rotating electric machine is higher than the synchronous rotational speed, the direction in which the second engagement device transfers a torque is not reversed. Consequently, no shock is caused by the reversal. Thus, the exemplary structure described above eliminates the need to stagger the timing of when the direction of the required torque required to be transferred to the wheels is reversed and the timing of when the internal combustion engine is started, thereby allowing the internal combustion engine to be started quickly. Further, at least when the required torque changes from the positive torque to the negative torque, this exemplary structure reduces shock that is transferred to the wheels upon reversal of the direction of the required torque.

In view of the above, an exemplary control device for controlling a vehicle drive system in which a first engagement device, a rotating electric machine, and a second engagement device are provided in a power transfer path connecting an internal combustion engine to wheels and are arranged sequentially from the internal combustion engine side includes an electronic control unit that is configured to, during start control that starts the internal combustion engine, bring the second engagement device into a slip engagement state and perform slip control that controls the rotating electric machine to maintain a state where there is a difference in rotational speed between a pair of engagement members of the second engagement device; a rotational speed of the rotating electric machine at which there is no difference in rotational speed between the pair of engagement members of the second engagement device is defined as a synchronous rotational speed; when a required torque that is a torque required to be transferred to the wheels via the second engagement device is a positive torque, the electronic control unit performs the slip control to raise the rotational speed of the rotating electric machine above the synchronous rotational speed; and when the required torque changes from the positive torque to a negative torque, the electronic control unit performs the slip control to limit transfer of the negative torque to an input member that drivingly couples the rotating electric machine and the second engagement device.

According to the exemplary structure described above, the slip control maintains the second engagement device in the slip engagement state during the start control that starts the internal combustion engine. This makes it hard to transfer, to the wheels, fluctuation in output torque of the internal combustion engine and torque fluctuation caused by a change in the state of engagement of the first engagement device, thus reducing shock associated with starting the internal combustion engine. Further, when the required torque is the positive torque during the start control of the internal combustion engine, it is possible to transfer the positive torque to the wheels by raising the rotational speed of the rotating electric machine above the synchronous rotational speed. In addition, when the required torque changes from the positive torque to the negative torque, the exemplary structure described above limits the transfer of the negative torque to the input member that drivingly couples the rotating electric machine and the second engagement device. In contrast to this structure, if the negative torque is transferred to the input member when the required torque changes from the positive torque to the negative torque, the rotational speed of the rotating electric machine that is drivingly coupled to the input member may decrease, so that a transition may occur from a state where the rotational speed of the rotating electric machine is higher than the synchronous rotational speed to a state where the rotational speed of the rotating electric machine is lower than the synchronous rotational speed. If the rotational speed of the rotating electric machine becomes lower than the synchronous rotational speed, the direction in which the second engagement device transfers a torque is reversed at a time when a magnitude relationship between the rotational speed of the rotating electric machine and the synchronous rotational speed is reversed. Consequently, shock corresponding to the transfer torque capacity of the second engagement device at the time may occur. On the other hand, if the transfer of the negative torque to the input member is limited when the required torque changes from the positive torque to the negative torque, the rotational speed of the rotating electric machine is maintained at the rotational speed higher than the synchronous rotational speed. As a result, a reversal of the direction in which the second engagement device transfers a torque is avoided, and no shock is caused by the reversal. Thus, the exemplary structure described above eliminates the need to stagger the timing of when the direction of the required torque required to be transferred to the wheels is reversed and the timing of when the internal combustion engine is started, thereby allowing the internal combustion engine to be started quickly. Further, at least when the required torque changes from the positive torque to the negative torque, this exemplary structure reduces shock that is transferred to the wheels upon reversal of the direction of the required torque.

In view of the above, an exemplary control device for controlling a vehicle drive system in which a first engagement device, a rotating electric machine, and a second engagement device are provided in a power transfer path connecting an internal combustion engine to wheels and are arranged sequentially from the internal combustion engine side includes an electronic control unit that is configured to, during start control that starts the internal combustion engine, bring the second engagement device into a slip engagement state and perform slip control that controls the rotating electric machine to maintain a state where there is a difference in rotational speed between a pair of engagement members of the second engagement device; a rotational speed of the rotating electric machine at which there is no difference in rotational speed between the pair of engagement members of the second engagement device is defined as a synchronous rotational speed; when a required torque that is a torque required to be transferred to the wheels via the second engagement device is a positive torque, the electronic control unit performs the slip control to raise the rotational speed of the rotating electric machine above the synchronous rotational speed; and when the required torque changes from the positive torque to a negative torque, the electronic control unit performs the slip control to maintain the rotational speed of the rotating electric machine at a rotational speed higher than the synchronous rotational speed.

According to the exemplary structure described above, the slip control maintains the second engagement device in the slip engagement state during the start control that starts the internal combustion engine. This makes it hard to transfer, to the wheels, fluctuation in output torque of the internal combustion engine and torque fluctuation caused by a change in the state of engagement of the first engagement device, thus reducing shock associated with starting the internal combustion engine. Further, when the required torque is the positive torque during the start control of the internal combustion engine, it is possible to transfer the positive torque to the wheels by raising the rotational speed of the rotating electric machine above the synchronous rotational speed. In addition, according to the exemplary structure described above, when the required torque changes from the positive torque to the negative torque, the rotational speed of the rotating electric machine is maintained at the rotational speed higher than the synchronous rotational speed. In contrast to this structure, if the rotational speed of the rotating electric machine becomes lower than the synchronous rotational speed when the required torque changes from the positive torque to the negative torque, the direction in which the second engagement device transfers a torque is reversed at a time when a magnitude relationship between the rotational speed of the rotating electric machine and the synchronous rotational speed is reversed. Consequently, shock corresponding to the transfer torque capacity of the second engagement device at the time may occur. On the other hand, if the rotational speed of the rotating electric machine is maintained at the rotational speed higher than the synchronous rotational speed when the required torque changes from the positive torque to the negative torque, the direction in which the second engagement device transfers a torque is not reversed. Consequently, no shock is caused by the reversal. Thus, the exemplary structure described above eliminates the need to stagger the timing of when the direction of the required torque required to be transferred to the wheels is reversed and the timing of when the internal combustion engine is started, thereby allowing the internal combustion engine to be started quickly. Further, at least when the required torque changes from the positive torque to the negative torque, this exemplary structure reduces shock that is transferred to the wheels upon reversal of the direction of the required torque.

DETAILED DESCRIPTION OF EMBODIMENTS

An embodiment of a control device is described with reference to the drawings. The control device is a control device for controlling a vehicle drive system. According to the present embodiment, a drive control device 30 (refer to FIG. 1) corresponds to the "control device".

In the description below, "drivingly coupled" refers to a state where two rotating elements are coupled to transfer a driving force therebetween. This concept includes a state where two rotating elements are coupled to rotate together and a state where two rotating elements are coupled through at least one transfer member to transfer a driving force therebetween. Such a transfer member includes various types of members (a shaft, a gear mechanism, a belt, a chain, etc.) that transfer rotation while maintaining or changing the rotational speed, and may include an engagement device (friction engagement device, intermesh engagement device, etc.) that selectively transfer rotation and a driving force.

Regarding the state of engagement of a friction engagement device, an "engagement state" refers to a state where a transfer torque capacity is generated at the friction engagement device. The transfer torque capacity is the magnitude of the maximum torque that the friction engagement device is allowed to transfer by friction, and the magnitude of the transfer torque capacity changes in proportion to an engagement pressure of the friction engagement device (a pressure that presses an input engagement member and an output engagement member against each other). The "engagement state" includes a "direct engagement state" where there is no rotational speed difference (slip) between a pair of engagement members (between an input engagement member and an output engagement member) of the friction engagement device and a "slip engagement state" where there is a rotational speed difference between the pair of engagement members of the friction engagement device.

On the other hand, a "disengagement state" refers to a state where no transfer torque capacity is generated at the friction engagement device. Drag between the engagement members (friction members) may generate the transfer torque capacity at the friction engagement device although the control device does not issue a command that causes the transfer torque capacity to be generated. In the present specification, such drag torque is not taken into account to classify the state of engagement, and the "disengagement state" also includes a state where drag between the engagement members generates the transfer torque capacity although the command that causes the transfer torque capacity to be generated is not issued.

Figure 1:
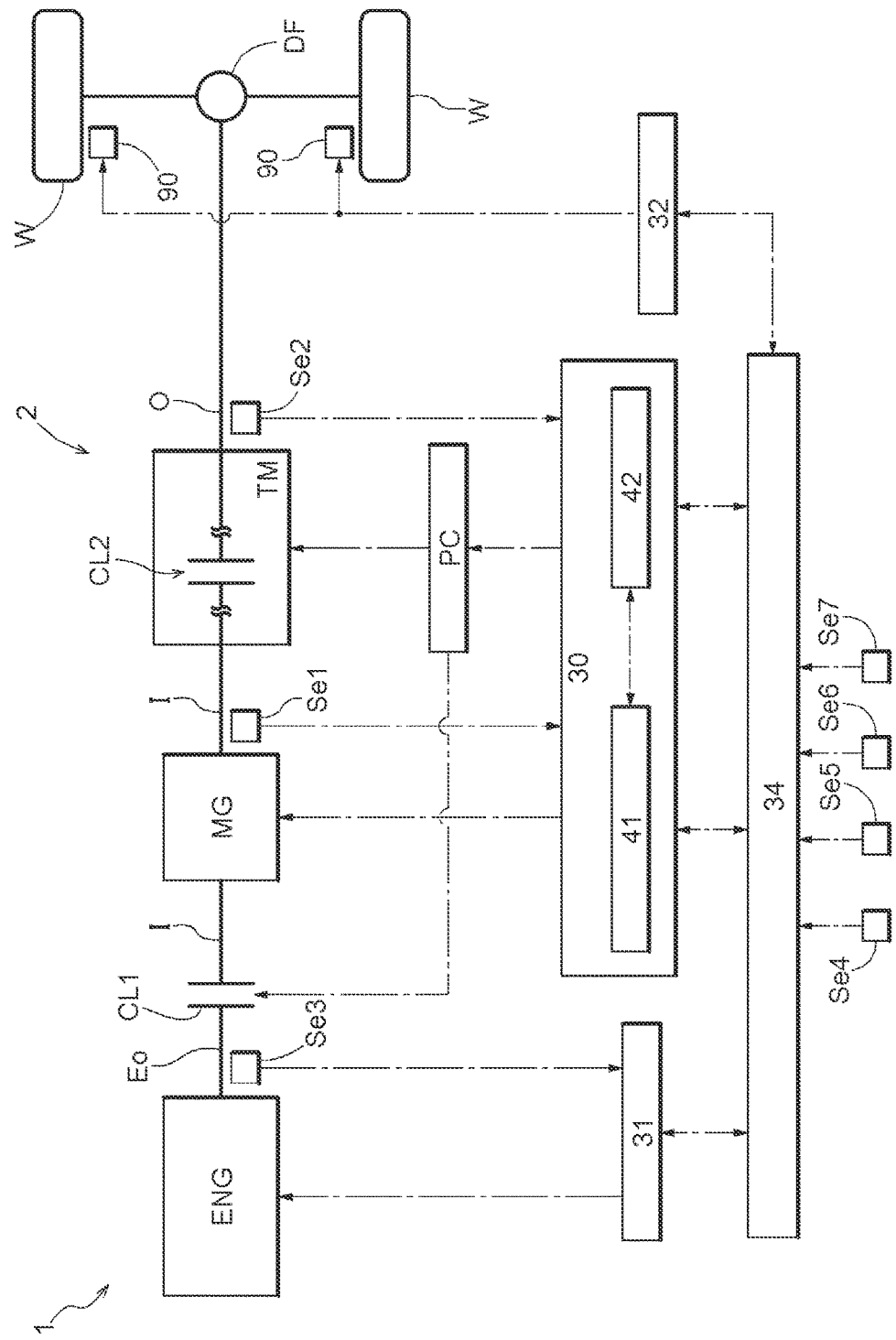
FIG. 1 is a schematic diagram illustrating a vehicle drive system and a control device according to an embodiment.

When the friction engagement device is in the engagement state, friction between the pair of engagement members transfers a torque between the pair of engagement members. When the friction engagement device is in the slip engagement state, a torque (slip torque) identical in magnitude to the transfer torque capacity is transferred by kinetic friction from one engagement member rotating at a higher speed to the other engagement member rotating at a lower speed. On the other hand, when the friction engagement device is in the direct engagement state, static friction transfers a torque of up to the magnitude of the transfer torque capacity acting between the pair of engagement members 1. Structure of Vehicle Drive System The structure of a vehicle drive system 2 to be controlled by the control device (the drive control device 30) according to the present embodiment is described. As illustrated in FIG. 1, a vehicle 1 (hybrid vehicle) includes an internal combustion engine ENG, the vehicle drive system 2, and wheels W. In FIG. 1, solid lines represent paths through which a driving force is transferred, and dot-and-dash lines represent paths through which a signal and hydraulic pressure are transferred. The vehicle drive system 2 includes a first engagement device CL1, a rotating electric machine MG, and a second engagement device CL2 that are provided in a power transfer path connecting the internal combustion engine ENG to the wheels W and that are arranged sequentially from the internal combustion engine ENG side. The first engagement device CL1 and the second engagement device CL2 are each a friction engagement device. The internal combustion engine is a motor (e.g., a gasoline engine, a diesel engine, etc.) that is driven by the combustion of fuel in the engine and thus generates power. The "rotating electric machine" is used as a concept including a motor (electric motor), a generator (electric generator), and a motor-generator that functions as either a motor or a generator as needed. The vehicle drive system 2 transfers the torque of at least one of the internal combustion engine ENG and the rotating electric machine MG to the wheels W, thus causing the vehicle 1 to travel. In the present specification, a torque in a direction that causes the vehicle 1 to travel forward (torque in a direction that causes forward acceleration) is defined as a positive torque, and a torque in the opposite direction is defined as a negative torque. The vehicle drive system 2 is structured so that the output torque of the internal combustion engine ENG is transferred as the positive torque to the wheels W. According to the present embodiment, the vehicle drive system 2 includes a transmission TM in the power transfer path between the rotating electric machine MG and the wheels W. The transmission TM includes multiple shifting engagement devices (refer to FIG. 2). According to the present embodiment, the second engagement device CL2 is one of the multiple shifting engagement devices (however, except a one-way clutch F). Specifically, the second engagement device CL2 is a clutch or a brake.

As illustrated in FIG. 1, the vehicle drive system 2 includes an input member I and an output member O. The input member I is a transfer member provided in the power transfer path between the first engagement device CL1 and the second engagement device CL2. The input member I drivingly couples the rotating electric machine MG and the second engagement device CL2. According to the present embodiment, the input member I is a shaft member serving as an input shaft of the transmission TM. The output member O is a transfer member provided in the power transfer path between the second engagement device CL2 and the wheels W. According to the present embodiment, the output member O is a shaft member serving as an output shaft of the transmission TM. An output differential gear device DF is provided in the power transfer path between the output member O and the wheels W, and rotation of the output member O is divided through the differential gear device DF and transferred to the right and left two wheels W.

An output shaft Eo (e.g., a crank shaft) of the internal combustion engine ENG is drivingly coupled to the input member I via the first engagement device CL1. The first engagement device CL1 is a clutch. According to the present embodiment, the output shaft Eo and the input member I rotate together in the direct engagement state where the first engagement device CL1 are directly engaged. When the internal combustion engine ENG is started, the output shaft Eo of the internal combustion engine ENG is driven to rotate (cranked), for example, by the torque of the rotating electric machine MG transferred via the first engagement device CL1. If the vehicle 1 includes another rotating electric machine (hereinafter, referred to as a "starter motor") dedicated to starting the internal combustion engine ENG, the output shaft Eo of the internal combustion engine ENG may be driven to rotate by the torque of the starter motor so that the internal combustion engine ENG is started.

The rotating electric machine MG receives electric power from an electricity storage device (not illustrated), thus performing power running, or supplies, to the electricity storage device, electric power generated (recovered) by the torque of the internal combustion engine ENG and the inertia force on the vehicle 1, thus charging the electricity storage device. Although not illustrated in the drawings, the rotating electric machine MG includes a stator fixed to a non-rotating member, such as a case, and a rotor drivingly coupled to the input member I. According to the present embodiment, the rotor of the rotating electric machine MG rotates with the input member I. Thus, the rotating electric machine MG (the rotor) and the internal combustion engine ENG (the output shaft Eo) rotate together in the direct engagement state where the first engagement device CL1 is directly engaged.

The transmission TM changes the speed of rotation of the input member I (a shifting input shaft) and transfers it to the output member O (a shifting output shaft). According to the present embodiment, the transmission TM is a multi-stage automatic transmission that is allowed to establish multiple shift speeds with different speed ratios. The transmission TM changes the speed of rotation of the input member I at a speed ratio corresponding to the established shift speed and transfers it to the output member O. The "speed ratio" is a ratio of the rotational speed of the input member I to the rotational speed of the output member O, namely, a value calculated by dividing the rotational speed of the input member I by the rotational speed of the output member O. The transmission TM includes multiple shifting engagement devices and establishes multiple shift speeds with different speed ratios in accordance with the state of engagement of each of the shifting engagement devices. According to the present embodiment, when two or more (two in the present example) of the shifting engagement devices are engaged while the others are disengaged, a corresponding one of the shift speeds is established.

Figures 2, 3:
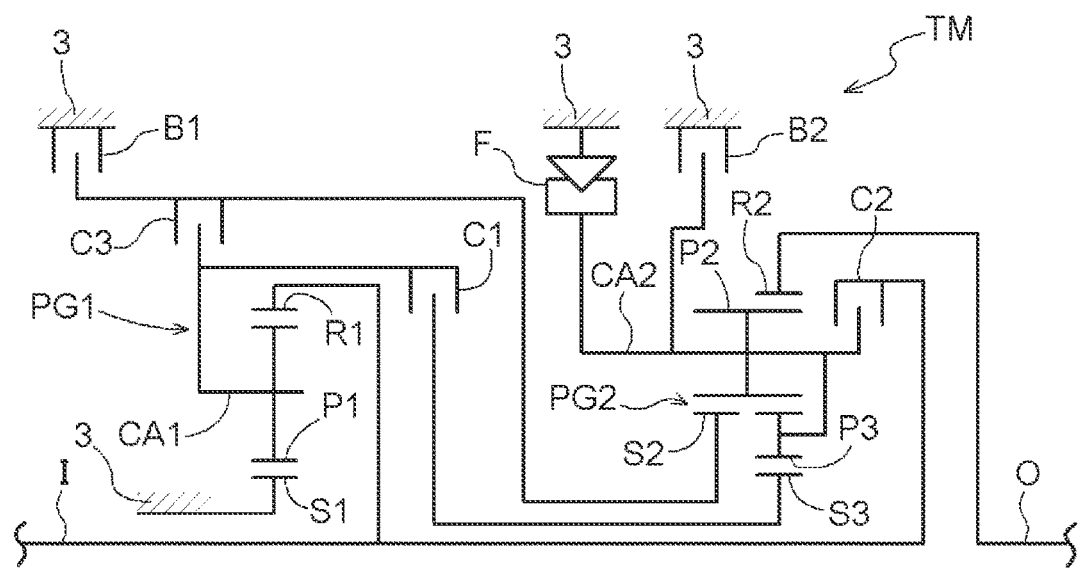
FIG. 2 is a skeleton diagram of a transmission according to the embodiment.
FIG. 3 is an operating table for the transmission according to the embodiment.

Specifically, as illustrated in FIG. 2, the transmission TM includes, as the shifting engagement devices, a first clutch C1, a second clutch C2, a third clutch C3, a first brake B1, a second brake B2, and a one-way clutch F (an overrunning clutch). All the shifting engagement devices except the one-way clutch F are each a friction engagement device. As shown in an operating table of FIG. 3, when two of the multiple shifting engagement devices are engaged while the others are disengaged, a corresponding one of the shift speeds is established. In the present example, the transmission TM is allowed to establish six forward shift speeds with different speed ratios (the first speed 1st, the second speed 2nd, the third speed 3rd, the fourth speed 4th, the fifth speed 5th, and the sixth speed 6th) and one reverse shift speed (Rev). The forward shift speed becomes smaller stepwise in order from the first speed to the sixth speed (i.e., as the shift speed becomes higher). In the operating table of FIG. 3, "○" indicates that a corresponding shifting engagement device is engaged, and "no mark" indicates that a corresponding shifting engagement device is disengaged. "(○)" indicates that engagement is made, for example, when braking (so-called engine braking) is performed using the rotational resistance of the internal combustion engine ENG. "(Δ)" indicates that disengagement is made when the rotational direction of a member (the second carrier CA2 in the present example) to be limited in rotation by the one-way clutch F is one direction, and that engagement is made when the rotational direction of the member is the other direction.

According to the present embodiment, as illustrated in FIG. 2, the transmission TM is structured by combining a first differential gear device PG1 and a second differential gear device PG2. The first differential gear device PG1 is structured with a single-pinion type planetary gear mechanism having three rotating elements (a first sun gear S1, a first carrier CA1, and a first ring gear R1). The first carrier CA1 supports multiple first pinion gears P1 that mesh with the first sun gear S1 while meshing with the first ring gear R1. The second differential gear device PG2 is structured with a Ravigneaux-type planetary gear mechanism having four rotating elements (a second sun gear S2, a third sun gear S3, a second carrier CA2, and a second ring gear R2). The second carrier CA2 supports the following: multiple second pinion gears P2 (long pinion gears) that mesh with the second sun gear S2 while meshing with the second ring gear R2; and multiple third pinion gears P3 (short pinion gears) that mesh with the second pinion gear P2 while meshing with the third sun gear S3.

The first ring gear R1 is drivingly coupled to the input member I and, in the present example, is coupled so as to rotate with the input member I. The second ring gear R2 is drivingly coupled to the output member O and, in the present example, is coupled so as to rotate with the output member O. The first carrier CA1 is drivingly coupled to the third sun gear S3 via the first clutch C1 and is also drivingly coupled to the second sun gear S2 via the third clutch C3. In the present example, the first carrier CA1 rotates with the third sun gear S3 in the direct engagement state where the first clutch C1 is directly engaged, and the first carrier CA1 rotates with the second sun gear S2 in the direct engagement state where the third clutch C3 is directly engaged. The first ring gear R1 is drivingly coupled to the second carrier CA2 via the second clutch C2. In the present example, the first ring gear R1 rotates with the second carrier CA2 in the direct engagement state where the second clutch C2 is directly engaged.

The first sun gear S1 is fixed to the vehicle drive system 2 or a case 3 (one example of a non-rotating member) of the transmission TM. The second sun gear S2 is selectively fixed to the case 3 by the first brake B1. The second carrier CA2 is selectively fixed to the case 3 by the second brake B2 and is limited in rotation relative to the case 3 to one direction by the one-way clutch F. When transferring the positive torque from the input member I to the output member O in the first speed 1st, the first clutch C1 is engaged while the other shifting engagement devices (however, except the one-way clutch) are disengaged. In this situation, when the reaction force of the positive torque transferred from the input member I to the third sun gear S3 via the first differential gear device PG1 is received by the second carrier CA2 being limited in rotation by the one-way clutch F, the positive torque is transferred to the output member O via the second ring gear R2. On the other hand, when transferring the negative torque from the input member I to the output member O in the first speed 1st, the second brake B2 is engaged in addition to the first clutch C1 because the rotation of the second carrier CA2 is not limited by the one-way clutch.

2. Structure of Control Device

As illustrated in FIG. 1, according to the present embodiment, in addition to the drive control device 30, a vehicle control device 34, an internal combustion engine control device 31, and a brake control device 32 are provided as a control device for controlling the condition (traveling condition, for example) of the vehicle 1. The drive control device 30, the vehicle control device 34, the internal combustion engine control device 31, and the brake control device 32 are hereinafter collectively referred to as a control device when their common structure is described. The control device includes an arithmetic processing unit, such as a CPU, as a core member and also includes a memory device, such as RAM or ROM. Functions executed by the control device are implemented by software (programs) stored in the memory device, such as ROM, by additional hardware, such as a computing circuit, or by both of them. The arithmetic processing unit of the control device operates as a computer for executing programs. The drive control device 30, the vehicle control device 34, the internal combustion engine control device 31, and the brake control device 32 are allowed to communicate with each other and perform cooperative control by sharing various types of information, such as sensor detection information and control parameters, with each other and by exchanging various types of control signals with each other. One control device may be structured as a combination of multiple hardware devices (multiple separate hardware devices) that are allowed to communicate with each other. Further, part or all of the drive control device 30, the vehicle control device 34, the internal combustion engine control device 31, and the brake control device 32 may be provided on common hardware.

The vehicle 1 includes various types of sensors, and the control device is allowed to acquire information detected by the various types of sensors. As examples of the sensors that the vehicle 1 includes, FIG. 1 illustrates an input rotational speed sensor Se1, an output rotational speed sensor Se2, an engine rotational speed sensor Se3, and an accelerator operation amount sensor Se4, a brake operation sensor Se5, a shift position sensor Se6, and a state-of-charge sensor Se7. The input rotational speed sensor Se1 detects the rotational speed of the input member I or the rotational speed of a member that rotates synchronously with the input member I. Rotating synchronously refers to rotating together or rotating at proportional rotational speeds. The output rotational speed sensor Se2 detects the rotational speed of the output member O or the rotational speed of a member that rotates synchronously with the output member O. The engine rotational speed sensor Se3 detects the rotational speed of the internal combustion engine ENG (the output shaft Eo) or the rotational speed of a member that rotates synchronously with the internal combustion engine ENG (the output shaft Eo). The control device acquires the rotational speeds of the input member I and the rotating electric machine MG (the rotor) on the basis of information detected by the input rotational speed sensor Se1, acquires the rotational speed of the output member O and a vehicle speed on the basis of information detected by the output rotational speed sensor Se2, and acquires the rotational speed of the internal combustion engine ENG (the output shaft Eo) on the basis of information detected by the engine rotational speed sensor Se3.

The accelerator operation amount sensor Se4 detects an accelerator operation amount corresponding to the amount by which an accelerator pedal is depressed by a driver. The brake operation sensor Se5 detects a brake operation amount corresponding to the amount by which a brake pedal is depressed by a driver. The shift position sensor Se6 detects a selected position of a shift lever. The shift lever is a lever that a driver operates to select one travel range among multiple travel ranges. The selected position of the shift lever (shift position) includes the following: a position to select a forward travel range (D range); a position to select a reverse travel range (R range); a position to select a neutral range (N range); and a position to select a parking range (P range). The state-of-charge sensor Se7 acquires the state of charge of or the amount of electricity stored in the electricity storage device that supplies electric power to the rotating electric machine MG. On the basis of sensor detection information including the accelerator operation amount, the vehicle speed, the shift position, and the state of charge of the electricity storage device, the vehicle control device 34 calculates a vehicle required torque that is a torque required to be transferred to the wheels W and also determines a traveling mode of the vehicle 1, a target shift speed that the transmission TM is caused to establish, etc. In accordance with the traveling mode and the target shift speed, the drive control device 30 (an engagement control portion 42 that will be described later) controls the state of engagement of each of the engagement devices including the first engagement device CL1 and the second engagement device CL2. The traveling mode includes the following: an electric traveling mode that transfers the torque of only the rotating electric machine MG to the wheels W so as to allow the vehicle 1 to travel; an engine traveling mode that transfers the torque of only the internal combustion engine ENG to the wheels W so as to allow the vehicle 1 to travel; and a hybrid traveling mode (parallel traveling mode) that transfers the torques of both the rotating electric machine MG and the internal combustion engine ENG to the wheels W so as to allow the vehicle 1 to travel. In the electric traveling mode, the first engagement device CL1 is brought into the disengagement state. In the engine traveling mode and the hybrid traveling mode, the first engagement device CL1 is brought into the engagement state.

The vehicle control device 34 integrates various types of control (torque control, engagement control, etc.) on the internal combustion engine ENG and the vehicle drive system 2 into a whole throughout the vehicle. The vehicle control device 34 functions to control torque sharing throughout the vehicle. Specifically, the vehicle control device 34 determines an internal combustion engine required torque and a rotating electric machine required torque by taking into account a torque sharing ratio between the internal combustion engine ENG and the rotating electric machine MG. The internal combustion engine required torque is a torque that the internal combustion engine ENG is required to output, and the rotating electric machine required torque is a torque that the rotating electric machine MG is required to output. When the rotating electric machine MG is caused to generate electricity, the rotating electric machine required torque is set to the negative torque. Basically, each of the internal combustion engine required torque and the rotating electric machine required torque is determined such that the sum of the internal combustion engine required torque and the rotating electric machine required torque is equal to the vehicle required torque.

The internal combustion engine control device 31 controls the operation of the internal combustion engine ENG. When the vehicle control device 34 issues a command indicating the internal combustion engine required torque, the internal combustion engine control device 31 controls the internal combustion engine ENG so that the internal combustion engine required torque is outputted. Further, when the vehicle control device 34 issues a request to start the internal combustion engine ENG, the internal combustion engine control device 31 starts the internal combustion engine ENG, for example, by starting fuel supply and ignition to the internal combustion engine ENG, and when the vehicle control device 34 issues a request to stop the internal combustion engine ENG, the internal combustion engine control device 31 stops the internal combustion engine ENG, for example, by stopping fuel supply and ignition to the internal combustion engine ENG.

The brake control device 32 controls a braking force that a brake device 90 applies to the wheels W. The brake device 90 is a device (a disc brake device or the like) that applies the braking force to the wheels W, for example, by friction. The vehicle control device 34 determines, on the basis of the brake operation amount, a first braking force that the brake device 90 is required to apply to the wheels W, and the brake control device 32 controls the brake device 90 so that the first braking force commanded by the vehicle control device 34 is applied to the wheels W. When applying, to the wheels W, a second braking force (a regenerative braking force) that is a braking force derived from regeneration by the rotating electric machine MG, the vehicle control device 34 determines each of the first braking force and the second braking force so that the sum of the first braking force and the second braking force is equal to a braking force corresponding to the brake operation amount.

The drive control device 30 controls the state of engagement of each of the first engagement device CL1 and the second engagement device CL2 and also controls the operation of the rotating electric machine MG. The drive control device 30 includes a rotating electric machine control portion 41 and an engagement control portion 42 that are allowed to communicate with each other. The rotating electric machine control portion 41 controls the operation of the rotating electric machine MG. The engagement control portion 42 controls the state of engagement of each of the engagement devices. Each of the rotating electric machine control portion 41 and the engagement control portion 42 is structured by software (programs) stored in the memory device, by additional hardware, such as a computing circuit, or by both of them. When the vehicle control device 34 issues a command indicating the rotating electric machine required torque, the rotating electric machine control portion 41 controls the rotating electric machine MG so that the rotating electric machine required torque is outputted. Specifically, the rotating electric machine control portion 41 controls the output torque of the rotating electric machine MG by controlling an inverter that converts a direct current voltage of the electricity storage device into an alternating current voltage and that supplies the alternating current voltage to the rotating electric machine MG. The engagement control portion 42 brings the engagement devices (including the first engagement device CL1 and the second engagement device CL2) that the vehicle drive system 2 has into their respective engagement states determined by the vehicle control device 34. According to the present embodiment, the engagement devices to be controlled by the engagement control portion 42 include the shifting engagement devices of the transmission TM. The engagement control portion 42 controls the state of engagement of each of the engagement devices so that the traveling mode determined by the vehicle control device 34 is established and so that the target shift speed determined by the vehicle control device 34 is established.

According to the present embodiment, the engagement devices to be controlled by the engagement control portion 42 each are a hydraulically driven friction engagement device. The engagement control portion 42 controls, via a hydraulic control device PC, a hydraulic pressure supplied to each of the engagement devices, thereby controlling the state of engagement of each engagement device. The engagement pressure of each of the engagement devices changes in proportion to the magnitude of the hydraulic pressure supplied to the engagement device. In other words, the magnitude of the transfer torque capacity generated at each of the engagement devices changes in proportion to the magnitude of the hydraulic pressure supplied to the engagement device. In accordance with the supplied hydraulic pressure, each of the engagement devices is brought into any of the following states of engagement: the direct engagement state; the slip engagement state; and the disengagement state. Although not described in detail, the hydraulic control device PC includes a hydraulic control valve (linear solenoid valve or the like) for regulating a hydraulic pressure of hydraulic oil supplied from an oil pump (not illustrated). For example, the oil pump may be a mechanical pump driven by a rotating member that the vehicle drive system 2 has, such as the output shaft Eo or the output member O, or may be an electric pump driven by a dedicated rotating electric machine. The hydraulic control device PC regulates the degree of opening of the hydraulic control valve in accordance with a hydraulic command from the engagement control portion 42 and thus supplies, to each of the engagement devices, the hydraulic oil with the hydraulic pressure corresponding to the hydraulic command.

The drive control device 30 performs slip control that controls the rotating electric machine MG to bring the second engagement device CL2 into the slip engagement state and to maintain a state where there is a difference in rotational speed between a pair of engagement members of the second engagement device CL2. The drive control device 30 performs the slip control during start control that starts the internal combustion engine ENG. Upon satisfaction of an internal combustion engine start condition that is a condition for starting the internal combustion engine ENG, the vehicle control device 34 determines that the request to start the internal combustion engine ENG is issued, thus performing the start control of the internal combustion engine ENG in cooperation with the internal combustion engine control device 31 and the drive control device 30. The internal combustion engine start condition is satisfied when the vehicle 1 needs the torque of the internal combustion engine ENG. For example, when the vehicle required torque cannot be obtained by using the rotating electric machine MG alone because a driver strongly depresses the accelerator pedal while the vehicle 1 is stopped or traveling in the electric traveling mode, the internal combustion engine start condition is satisfied. Further, when the internal combustion engine ENG needs to be started in order to charge the electricity storage device, the internal combustion engine start condition is satisfied.

In the slip control, according to whether a required torque is positive or negative, when the required torque is the positive torque, the drive control device 30 performs positive slip control that raises the rotational speed of the rotating electric machine MG above a synchronous rotational speed, and when the required torque is the negative torque, the drive control device 30 performs negative slip control that lowers the rotational speed of the rotating electric machine MG below the synchronous rotational speed. In short, in the slip control, if the required torque is the positive torque, the drive control device 30 raises the rotational speed of the rotating electric machine MG above the synchronous rotational speed. The required torque here refers to a torque that is required to be transferred to the wheels W via the second engagement device CL2 and that is determined by the vehicle control device 34 that also determines the vehicle required torque. According to the present embodiment, the required torque is basically equal to the vehicle required torque. For example, if another driving force source (a driving force source for the wheels W) other than the internal combustion engine ENG and the rotating electric machine MG is provided in the power transfer path between the second engagement device CL2 and the wheels W, the sum of the required torque and a torque that the other driving force source is required to output is basically equal to the vehicle required torque. The synchronous rotational speed here refers to the rotational speed of the rotating electric machine MG at which there is no difference in rotational speed between the pair of engagement members of the second engagement device CL2. According to the present embodiment, the second engagement device CL2 is any one of the shifting engagement devices that are already engaged to establish a shift speed at a point in time when the slip control is started. Thus, the synchronous rotational speed is the rotational speed of the input member I when all the shifting engagement devices engaged to establish the shift speed are in the direct engagement state, and is equal to the product of the rotational speed of the output member O and the speed ratio of the shift speed. It is noted that, to allow for a possible change in the target shift speed during the slip control, any shifting engagement device other than the shifting engagement device that is shared between a shift speed established at a point in time when the slip control is started and a next shift speed lower or higher than the shift speed (shifting engagement device engaged in both the shift speeds) can be selected as the second engagement device CL2. According to the present embodiment, for example, if the shift speed is the second speed 2nd at a point in time when the slip control is started, the first brake B1 may be selected as the second engagement device CL2, and if the shift speed is the third speed 3rd at a point in time when the slip control is started, the third clutch C3 may be selected as the second engagement device CL2. It is noted that if the shift speed is the first speed 1st at a point in time when the slip control is started, the first clutch C1 is basically selected as the second engagement device CL2.

In the positive slip control, the rotational speed of the rotating electric machine MG is raised above the synchronous rotational speed, so that the rotational speed of an input engagement member of the second engagement device CL2 becomes higher than the rotational speed of an output engagement member of the second engagement device CL2. As a result, the positive torque corresponding to the engagement pressure (transfer torque capacity) of the second engagement device CL2 is transferred to the wheels W via the second engagement device CL2. In the positive slip control, the engagement pressure of the second engagement device CL2 is set to a magnitude that allows the positive torque equal in magnitude to the required torque to be transferred to the wheels W. On the other hand, in the negative slip control, the rotational speed of the rotating electric machine MG is lowered below the synchronous rotational speed, so that the rotational speed of the input engagement member of the second engagement device CL2 becomes lower than the rotational speed of the output engagement member of the second engagement device CL2. As a result, the negative torque corresponding to the engagement pressure (transfer torque capacity) of the second engagement device CL2 is transferred to the wheels W via the second engagement device CL2. In the negative slip control, the engagement pressure of the second engagement device CL2 is set to a magnitude that allows the negative torque equal in magnitude to the required torque to be transferred to the wheels W. The input engagement member of the second engagement device CL2 is one of the pair of engagement members of the second engagement device CL2 and is drivingly coupled to the rotating electric machine MG without via the other engagement member. The output engagement member of the second engagement device CL2 is one of the pair of engagement members of the second engagement device CL2 and is drivingly coupled to the wheels W without via the other engagement member. According to the present embodiment, as illustrated in FIG. 2, the input engagement member of the second engagement device CL2 is coupled to and rotates with the input member I.

The drive control device 30 prohibits the negative slip control if the required torque changes from the positive torque to the negative torque during the performance of the slip control. Specifically, during the performance of the slip control, the drive control device 30 raises the rotational speed of the rotating electric machine MG above the synchronous rotational speed if the required torque is the positive torque, and maintains the rotational speed of the rotating electric machine MG at a rotational speed higher than the synchronous rotational speed when the required torque changes from the positive torque to the negative torque. Thus, when continuing to perform the slip control after the required torque changes from the positive torque to the negative torque, the drive control device 30 continues to perform the positive slip control (a period from T03 to T04 in an example of FIG. 5, which will be referred to later). Since the negative slip control is prohibited when the required torque changes from the positive torque to the negative torque, the drive control device 30 performs the negative slip control only if the required torque is the negative torque when the slip control is started. In contrast, according to the present embodiment, the drive control device 30 allows the positive slip control if the required torque changes from the negative torque to the positive torque during the performance of the slip control. Thus, when continuing to perform the slip control after the required torque changes from the negative torque to the positive torque, the drive control device 30 continues to perform the slip control by switching from the negative slip control to the positive slip control.

As already described, the vehicle required torque (basically, equal to the required torque) is calculated on the basis of the accelerator operation amount (according to the present embodiment, the accelerator operation amount detected by the accelerator operation amount sensor Se4) and other information including the state of charge of the electricity storage device. Consequently, although whether the required torque is positive or negative does not uniquely correspond to whether the accelerator operation amount increases or decreases, there is an overall trend that the required torque becomes smaller (if the required torque is negative, its absolute value becomes larger) as the accelerator operation amount becomes smaller. Therefore, if the accelerator operation amount decreases during the performance of the positive slip control, the required torque may change from the positive torque to the negative torque. From this point of view, according to the present embodiment, during the slip control, when the accelerator operation amount decreases under a condition where the rotational speed of the rotating electric machine MG is higher than the synchronous rotational speed, the drive control device 30 maintains the rotational speed of the rotating electric machine MG at the rotational speed higher than the synchronous rotational speed. The "when the accelerator operation amount decreases" refers not only to when the accelerator operation amount is decreasing, but also to when the accelerator operation amount decreases to and is maintained at a certain value (e.g., zero). Control that maintains the rotational speed of the rotating electric machine MG at the rotational speed higher than the synchronous rotational speed is hereinafter referred to as a "maintenance control". The required torque does not always change from the positive torque to the negative torque when the accelerator operation amount decreases under the condition where the rotational speed of the rotating electric machine MG is higher than the synchronous rotational speed. However, performing the maintenance control in response to a decrease in the accelerator operation amount makes it possible to prohibit the negative slip control when the required torque changes from the positive torque to the negative torque due to the decrease in the accelerator operation amount. In other words, according to the present embodiment, the maintenance control is performed when the accelerator operation amount decreases under the condition where the rotational speed of the rotating electric machine MG is higher than the synchronous rotational speed. This structure allows the maintenance control to be performed when the required torque changes from the positive torque to the negative torque during the performance of the slip control, thus prohibiting the negative slip control. During a period of time where the required torque is the positive torque after the accelerator operation amount decreases (a period from T02 to T03 in the example of FIG. 5), the rotational speed of the rotating electric machine MG is maintained at the rotational speed higher than the synchronous rotational speed by the positive slip control being performed. Thus, during a period of time where the required torque is the positive torque, the maintenance control is performed concomitantly with the positive slip control.

As describe above, if the required torque changes from the positive torque to the negative torque during the performance of the slip control, the drive control device 30 prohibits the negative slip control, thereby maintaining the rotational speed of the rotating electric machine MG at the rotational speed higher than the synchronous rotational speed. Specifically, according to the present embodiment, while prohibiting the negative slip control, the drive control device 30 outputs a signal (negative slip prohibitive signal) indicating that the negative slip control is being prohibited to the vehicle control device 34 that controls torque sharing throughout the vehicle. The negative slip prohibitive signal is a signal commanding that the rotational speed of the rotating electric machine MG be not lowered below the synchronous rotational speed. This signal is outputted to the vehicle control device 34 while the required torque is the negative torque and the rotational speed of the rotating electric machine MG is maintained at the rotational speed higher than the synchronous rotational speed. Thus, the vehicle control device 34 that controls torque sharing throughout the vehicle is informed that no negative torque is allowed to be transferred to the wheels W via the second engagement device CL2.

According to the present embodiment, the drive control device 30 outputs the negative slip prohibitive signal to the vehicle control device 34 while having the possibility of prohibiting the negative slip control later as well as while prohibiting the negative slip control. When the required torque is the negative torque, there is no possibility that the required torque will change from the positive torque to the negative torque. However, when the required torque is the positive torque, there is a possibility that the required torque will change later from the positive torque to the negative torque. From this point of view, according to the present embodiment, if the required torque is the positive torque at a point in time when the start control of the internal combustion engine ENG is started (a time T01 in the example of FIG. 5), the drive control device 30 outputs the negative slip prohibitive signal to the vehicle control device 34 from that point in time to a point in time when the slip control is finished. Further, if the required torque changes from the negative torque to the positive torque at a point in time after the start control of the internal combustion engine ENG is started, the drive control device 30 outputs the negative slip prohibitive signal to the vehicle control device 34 from the point in time when the change occurs to the point in time when the slip control is finished. Alternatively, the drive control device 30 may be structured to output the negative slip prohibitive signal to the vehicle control device 34 on a condition that the rotational speed of the rotating electric machine MG is maintained at the rotational speed higher than the synchronous rotational speed, instead of the condition that the required torque is the positive torque. In this alternative, the drive control device 30 is structured to output the negative slip prohibitive signal to the vehicle control device 34 while maintaining the rotational speed of the rotating electric machine MG at the rotational speed higher than the synchronous rotational speed in response to the decrease in the accelerator operation amount (the period from T02 to T04 in the example of FIG. 5).

According to the present embodiment, while outputting the negative slip prohibitive signal to the vehicle control device 34, the drive control device 30 performs negative torque limitation control that limits the transfer of the negative torque to the input member I so that the negative slip control is not performed. In other words, during the performance of the negative torque limitation, the transfer of the negative torque to the input member I is limited if the required torque changes from the positive torque to the negative torque, so that the rotational speed of the rotating electric machine MG is maintained at the rotational speed higher than the synchronous rotational speed. Thus, as long as the negative torque limitation is performed in the positive slip control, the rotational speed of the rotating electric machine MG is maintained at the rotational speed higher than the synchronous rotational speed even if the accelerator operation amount decreases. It is noted that although the output torques of both the internal combustion engine ENG and the rotating electric machine MG are transferred to the input member I, the negative torque limitation control is considered as control for limiting the negative torque (regenerative torque) outputted from the rotating electric machine MG, by neglecting the output torque of the internal combustion engine ENG and a friction torque (negative torque) of the internal combustion engine ENG caused when combustion is stopped. As long as the negative torque limitation is performed, the internal combustion engine required torque and the rotating electric machine required torque are determined so that no negative torque is transferred to the input member I. According to the present embodiment, while the negative slip prohibitive signal is outputted from the drive control device 30 under the condition where the vehicle required torque is the negative torque, the vehicle control device 34 commands the brake control device 32 to apply a braking force corresponding to the negative torque to the wheels W. If another rotating electric machine other than the rotating electric machine MG is additionally provided in the power transfer path between the second engagement device CL2 and the wheels W, or if another rotating electric machine is additionally provided and drivingly coupled to wheels (e.g., front wheels if the wheels W are rear wheels) other than the wheels W to which the rotating electric machine MG is drivingly coupled via the second engagement device CL2, at least part of the braking force corresponding to the vehicle required torque may be generated through regeneration by the other rotating electric machine.

Figure 4:
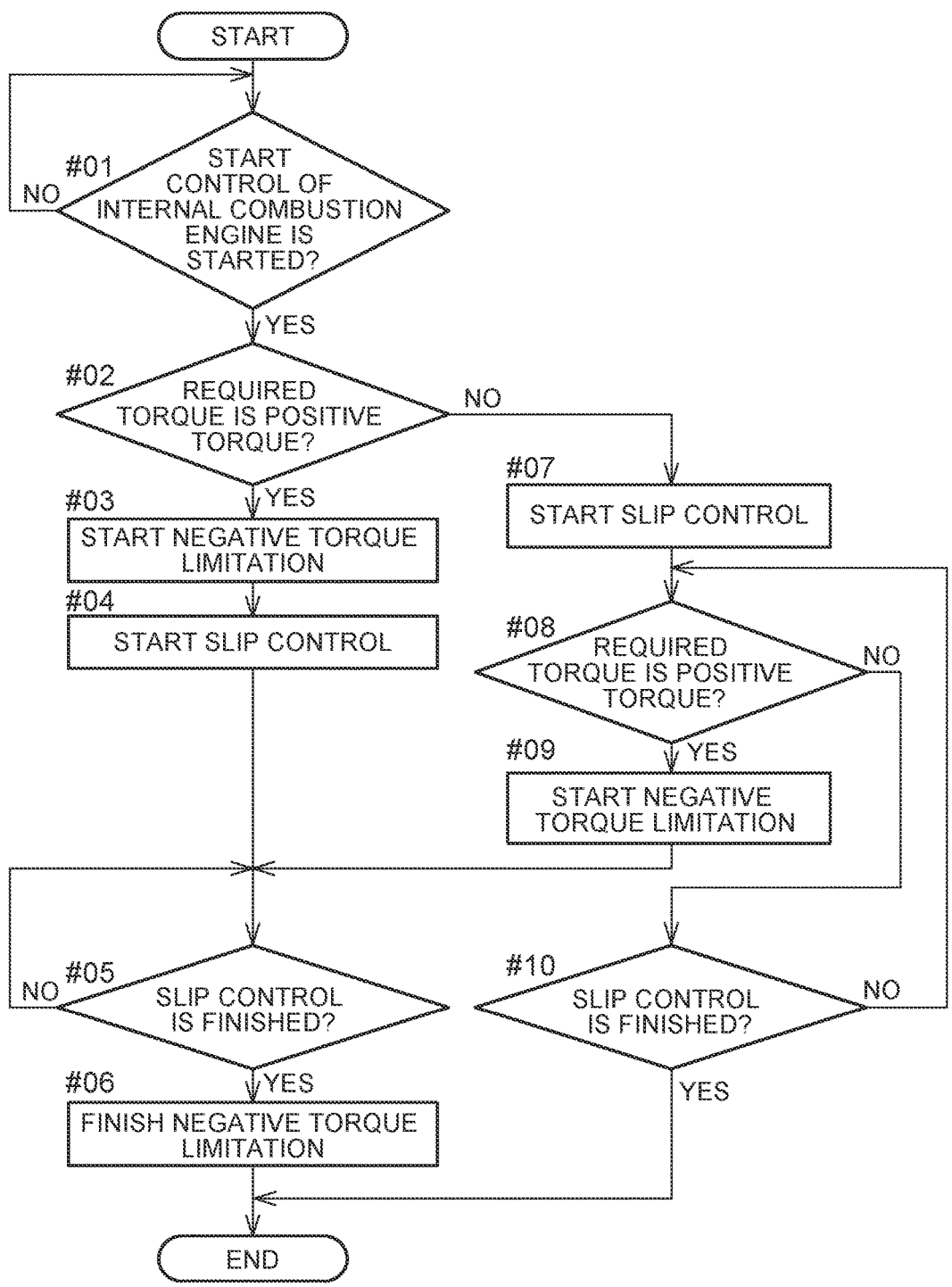
FIG. 4 is a flowchart illustrating a procedure of negative torque limitation control according to the embodiment.

According to the present embodiment, the drive control device 30 performs the negative torque limitation control according to a procedure illustrated in FIG. 4. When the start control of the internal combustion engine ENG is started (Yes in step #01), the drive control device 30 determines whether the required torque is the positive torque at that point in time (step #02). If the required torque is the positive torque (Yes in step #02), the drive control device 30 starts the negative torque limitation (step #03) and starts the slip control (step #04). It is noted that the slip control does not need to be started at the same time as the negative torque limitation control. In the example illustrated in FIG. 5, the slip control is started at a point in time (time T02) a predetermined time later than a point in time (time T01) when the negative torque limitation is started. The drive control device 30 continues to perform the negative torque limitation until the slip control is finished (No in step #05). Then, if the slip control is finished (Yes in step #05), the drive control device 30 finishes the negative torque limitation (step #06), and the procedure ends.

In contrast, if the required torque is not the positive torque at the point in time when the start control of the internal combustion engine ENG is started (No in step #02), the drive control device 30 starts the slip control without starting the negative torque limitation (step #07). Then, the drive control device 30 determines whether the required torque changes to the positive torque (step #08) repeatedly until the slip control is finished (No in step #10). If the required torque changes to the positive torque (Yes in step #08) before the slip control is finished, the drive control device 30 starts the negative torque limitation (step #09). After that, the drive control device 30 continues to perform the negative torque limitation until the slip control is finished (No in step #05). Then, if the slip control is finished (Yes in step #05), the drive control device 30 finishes the negative torque limitation (step #06), and the procedure ends. If the slip control is finished before the required torque changes to the positive torque (Yes in step #10), the procedure ends without the negative torque limitation being performed.

Next, specific details of the negative torque limitation control are described with reference to the example illustrated in FIG. 5. In the example illustrated in FIG. 5, the torque of the rotating electric machine MG that is transferred via the first engagement device CL rotates the internal combustion engine ENG (the output shaft Eo) and thus starts the internal combustion engine ENG. Until the time T01, the traveling mode is set to the electric traveling mode, the first engagement device CL is controlled to be in the disengagement state, and the second engagement device CL2 is controlled to be in the direct engagement state. Further, the internal combustion engine ENG stops rotating, and the rotating electric machine MG outputs the positive torque corresponding to the required torque (the vehicle required torque). It is noted that in FIG. 5, "input torque" refers to a torque transferred to the input member I, "target" refers to the required torque converted into a torque at the input member I, and "actual" refers to an actual torque transferred to the input member I. Further, "output torque" refers to an actual torque transferred to the output member O. According to the present embodiment, the "input torque" is equal to a torque inputted to the transmission TM from the internal combustion engine ENG side, and the "output torque" is equal to a torque outputted from the transmission TM to the wheels W side.

When the internal combustion engine start condition is satisfied at the time T01, the start control of the internal combustion engine ENG is started by cooperative control among the vehicle control device 34, the drive control device 30, and the internal combustion engine control device 31. In the present example, since the required torque is the positive torque at the point in time (the time T01) when the start control of the internal combustion engine ENG is started, the negative torque limitation is started at the time T01. In FIG. 5, a broken line labeled "negative torque limitation" indicates that the "input torque" is limited to a value not less than a value represented by the broken line. Thus, there is no possibility for the actual "input torque" to be the negative torque during the period from T01 to T04. It is noted that the negative torque limitation is not performed until the time T01 and that, in FIG. 5, a broken line representing a large negative value is used to indicate that the negative torque limitation is not performed. As illustrated in FIG. 5, in the present example, the accelerator operation amount increases during a period of time including the time T01, and the accelerator operation amount starts to decrease toward zero just after the positive slip control is started at the time T02. After the accelerator operation amount becomes zero at a point in time before the time T03, the accelerator operation amount remains zero until after the time T04.

When the start control of the internal combustion engine ENG is started, the engagement control portion 42 increases a hydraulic command for the first engagement device CL1 from zero, thereby causing the first engagement device CL1 to transition from the disengagement state to the slip engagement state. Thus, a torque is transferred from the rotating electric machine MG side to the internal combustion engine ENG side via the first engagement device CL1, and accordingly, the rotational speed of the internal combustion engine EG starts to increase. In the present example, the rotational speed of the internal combustion engine ENG starts to increase before the second engagement device CL2 transitions from the direct engagement state to the slip engagement state (before the time T02). Further, the engagement control portion 42 lowers a hydraulic command for the second engagement device CL2, thereby causing the second engagement device CL2 to transition from the direct engagement state to the slip engagement state. In the example illustrated in FIG. 5, it is determined at the time T02 that the second engagement device CL2 transitions already from the direct engagement state to the slip engagement state, and then the rotating electric machine control portion 41 starts the slip control. In this slip control, control (rotational speed control) is performed that regulates the output torque of the rotating electric machine MG so that the rotational speed of the rotating electric machine MG approaches a target rotational speed (the broken line labeled "target" in FIG. 5). It is noted that, before the time T02 and after the time T04, no target rotational speed is set because control (torque control) that causes the output torque of the rotating electric machine MG to approach a target torque is performed. In FIG. 5, a broken line representing a large positive value is used to indicate that no target rotational speed is set.

Since the required torque is the positive torque at the time T02, the rotating electric machine control portion 41 starts the positive slip control at the time T02. Thus, as illustrated in FIG. 5, the target rotational speed of the rotating electric machine MG is set higher than the synchronous rotational speed (dot-and-dash line labeled "synchronous" in FIG. 5). Then, when the rotational speed of the internal combustion engine ENG increases to the rotational speed (or near the rotational speed) of the rotating electric machine MG, the hydraulic command for the first engagement device CL1 is raised to a full engagement pressure so that the first engagement device CL1 transitions from the slip engagement state to the direct engagement state. The full engagement pressure here refers to an engagement pressure enough to maintain an engagement state without slip (the direct engagement state) even when the torque transferred to the first engagement device CL1 fluctuates. It is noted that combustion in the internal combustion engine ENG is started after the rotational speed of the internal combustion engine ENG exceeds a rotational speed that allows the combustion.

The engagement pressure of the second engagement device CL2 that is set after the time T02 is set to a magnitude that allows the positive torque equal in magnitude to the required torque to be transferred to the wheels W. In the example illustrated in FIG. 5, the engagement pressure of the second engagement device CL2 decreases with decrease in the required torque after the time T02. Then, the required torque becomes zero at the time T03, and the required torque is the negative torque after the time T03. This situation may occur, for example, when a driver performs a braking operation after the internal combustion engine start condition is satisfied. In the present example, the accelerator operation amount starts to decrease toward zero just after the positive slip control is started, and the required torque decreases in response to the decrease in the accelerator operation amount. Then, in response to the decrease in the accelerator operation amount, the drive control device 30 performs the maintenance control that maintains the rotational speed of the rotating electric machine MG at the rotational speed higher than the synchronous rotational speed. During the period of time where the required torque is the positive torque (the period from T02 to T03), the rotational speed of the rotating electric machine MG is maintained at the rotational speed higher than the synchronous rotational speed by continuing the positive slip control started at the time T02.

Figure 5:
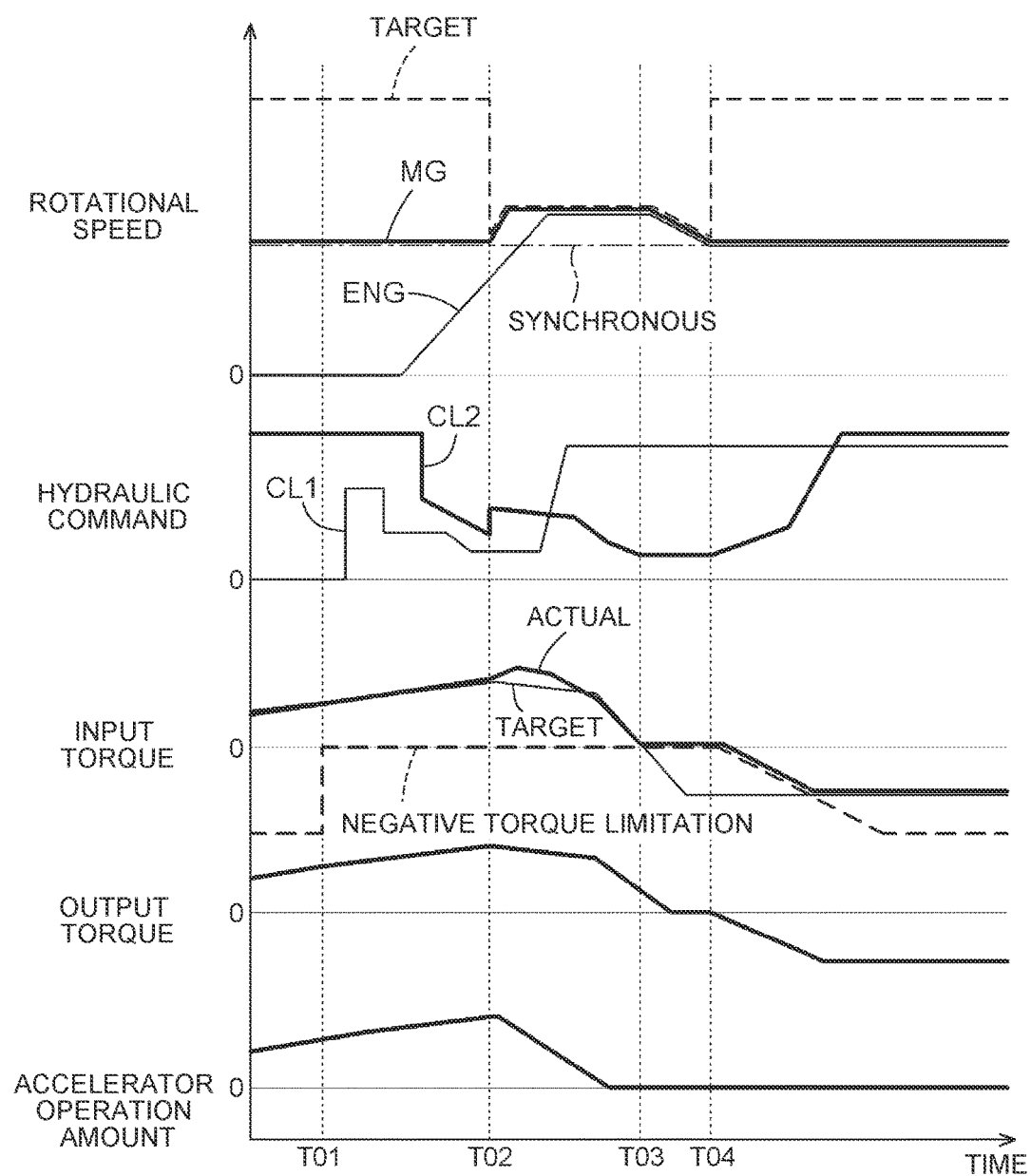
FIG. 5 is a timing chart illustrating an example of control behavior according to the embodiment.
Figure 6:
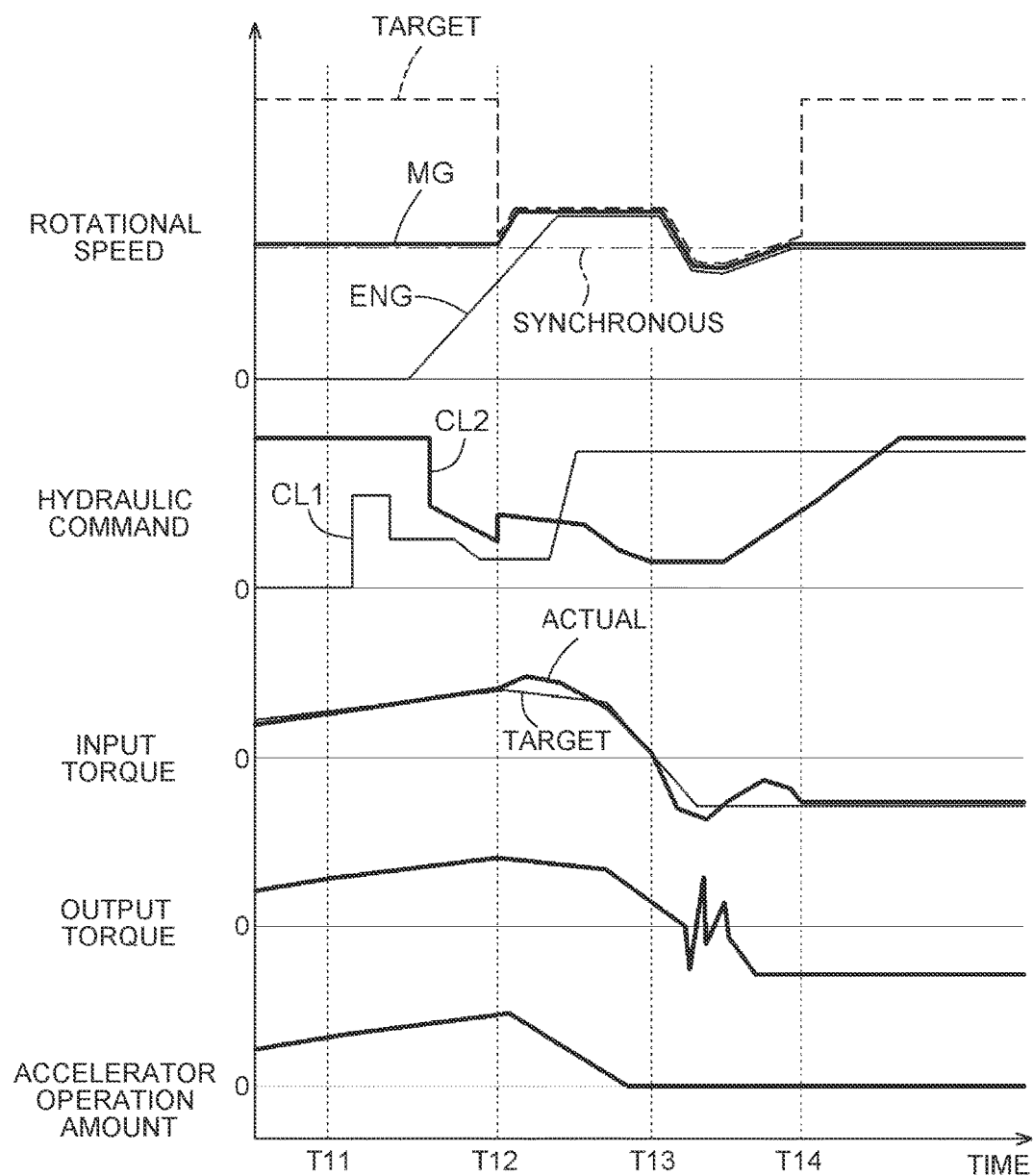
FIG. 6 is a timing chart illustrating an example of control behavior according to a comparison example.

If the negative torque limitation is not performed like in a comparison example illustrated in FIG. 6, that is, if the negative slip control is not prohibited when the required torque changes from the positive torque to the negative torque, the negative slip control is performed when the required torque changes to the negative torque. Thus, as illustrated in FIG. 6, after a point in time (a time T13) when the required torque changes from the positive torque to the negative torque, a transition occurs from a state where the rotational speed of the rotating electric machine MG is higher than the synchronous rotational speed to a state where the rotational speed of the rotating electric machine MG is lower than the synchronous rotational speed. It is noted that a time T1, a time T12, and a time T13 in FIG. 6 respectively correspond to the time T01, the time T02, and the time T03 in FIG. 5.

When the transition occurs from the state where the rotational speed of the rotating electric machine MG is higher than the synchronous rotational speed to the state where the rotational speed of the rotating electric machine MG is lower than the synchronous rotational speed, a transition occurs from a state where the positive torque is transferred to the wheels W via the second engagement device CL2 to a state where the negative torque is transferred to the wheels W via the second engagement device CL2. A direction in which the second engagement device CL2 transfers the positive torque is reversed accordingly, and thus shock may be transferred to the output member O as illustrated in FIG. 6. This is because, although the engagement pressure of the second engagement device CL2 is held at a relatively low pressure (e.g., a stroke end pressure) as the required torque decreases, a transfer torque capacity corresponding to the low pressure is generated at the second engagement device CL2. Since the direction in which the second engagement device CL2 transfers the positive torque is reversed with the transfer torque capacity being generated at the second engagement device CL2, shock corresponding to the transfer torque capacity may occur. It is noted that the stroke end pressure refers to an engagement pressure (hydraulic pressure) for positioning a piston at the stroke end position. After the engagement pressure exceeds the stroke end pressure, the transfer torque capacity increases in proportion to an increase in the engagement pressure. However, even when the engagement pressure is equal to the stroke end pressure, the transfer torque capacity is generally not zero.

In contrast, in the example according to the present embodiment illustrated in FIG. 5, when the required torque changes from the positive torque to the negative torque, the negative slip control is prohibited. Thus, when the required torque changes from the positive torque to the negative torque, the rotational speed of the rotating electric machine MG is maintained at the rotational speed higher than the synchronous rotational speed. According to the present embodiment, the maintenance control is performed after the time T02 in response to the decrease in the accelerator operation amount under the condition where the rotational speed of the rotating electric machine MG is higher than the synchronous rotational speed. This maintains the rotational speed of the rotating electric machine MG at the rotational speed higher than the synchronous rotational speed even if the required torque changes from the positive torque to the negative torque. Thus, the direction in which the second engagement device CL2 transfers the positive torque is not reversed, and shock transferred to the output member O is reduced accordingly. In the example illustrated in FIG. 5, after the point in time (the time T03) when the required torque changes from the positive torque to the negative torque, the target rotational speed is reduced gradually toward the synchronous rotational speed. Then, when the rotational speed of the rotating electric machine MG decreases to the synchronous rotational speed (or near the synchronous rotational speed), the hydraulic command for the second engagement device CL2 is raised to the full engagement pressure so that the second engagement device CL2 transitions from the slip engagement state to the direct engagement state. Further, in the example illustrated in FIG. 5, the engagement pressure of the second engagement device CL2 is adjusted to a standby pressure while the negative slip control is prohibited (the period from T03 to T04). Specifically, while the required torque is the negative torque and the rotational speed of the rotating electric machine MG is maintained at the rotational speed higher than the synchronous rotational speed, the engagement pressure of the second engagement device CL2 is adjusted to the standby pressure. In other words, when the required torque is the negative torque during a period of time where the rotational speed of the rotating electric machine MG is maintained at the rotational speed higher than the synchronous rotational speed in response to the decrease in the accelerator operation amount, the engagement pressure of the second engagement device CL2 is adjusted to the standby pressure. More specifically, the engagement pressure of the second engagement device CL2 is adjusted to be the standby pressure during a period of time where the required torque is the negative torque (the period from T03 to T04), within a period of time where the rotational speed of the rotating electric machine MG is maintained at the rotational speed higher than the synchronous rotational speed in response to the decrease in the accelerator operation amount (the period from T02 to T04). The standby pressure here refers to an engagement pressure during standby, prior to actual engagement that causes the second engagement device CL2 to be engaged, and is set to a value larger than zero. For example, the standby pressure may be set to the stroke end pressure or an engagement pressure that is lower than the stroke end pressure by a predetermined amount.

In the example illustrated in FIG. 5, the slip control is finished at the time T04. According to the present embodiment, if the required torque is the negative torque at the point in time when the slip control is finished, the drive control device 30 causes the torque transferred to the wheels W via the second engagement device CL2 to gradually decrease with a predetermined decreasing gradient toward the required torque. Thus, in the example illustrated in FIG. 5, unlike the required torque, the torque transferred to the input member I is limited not to change to the negative torque during the period from T03 to T04, but the torque transferred to the input member I decreases with the predetermined decreasing gradient toward the negative required torque after time T4. Then, after the torque transferred to the input member I reaches the required torque, the negative torque having a magnitude corresponding to the required torque is transferred to the input member I. The decreasing gradient is determined, for example, in accordance with the magnitude of the required torque (negative torque), the vehicle mode (torque responsivity setting), the shift speed being established by the transmission TM, etc. In the present example, the decreasing gradient has a linear shape with a constant slope. Alternatively, the decreasing gradient may have a curved shape or have a slope changing with time (e.g., the slope decreases after increasing). Further, if the required torque is the negative torque at the point in time when the slip control is finished, the drive control device 30 may cause the torque transferred to the wheels W via the second engagement device CL2 to change stepwise.

In the example described with reference to FIG. 5, the internal combustion engine ENG (the output shaft Eo) is rotated by the torque of the rotating electric machine MG transferred via the first engagement device CL1 so that the internal combustion engine ENG is started. Control similar to that shown in FIG. 5 is applicable to a case where the internal combustion engine ENG (the output shaft Eo) is rotated by the torque of a starter motor so that the internal combustion engine ENG is started. Although not described in detail, in that case, unlike in the example illustrated in FIG. 5, the timing of when the first engagement device CL1 is caused to transition from the disengagement state to the engagement state is set to a point in time after the combustion in the internal combustion engine ENG is started.

3. Other Embodiments

Other embodiments of the control device are described. It is noted that, as long as there is no inconsistency, structures disclosed in any one of the embodiments described below may be used in combination with structures disclosed in any other of the embodiments.

Figure 7:
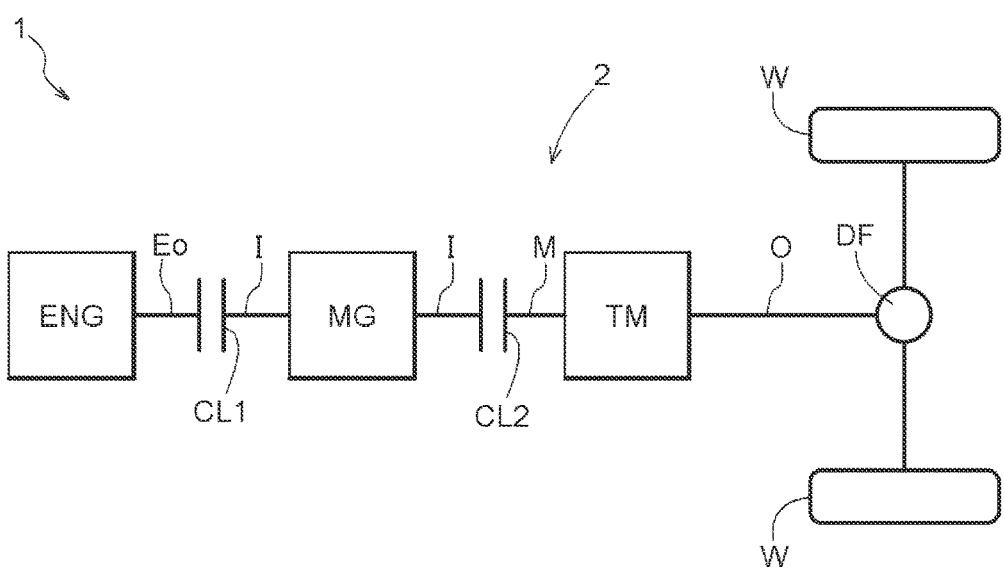
FIG. 7 is a schematic diagram illustrating a vehicle drive system according to another embodiment.
Figure 8:
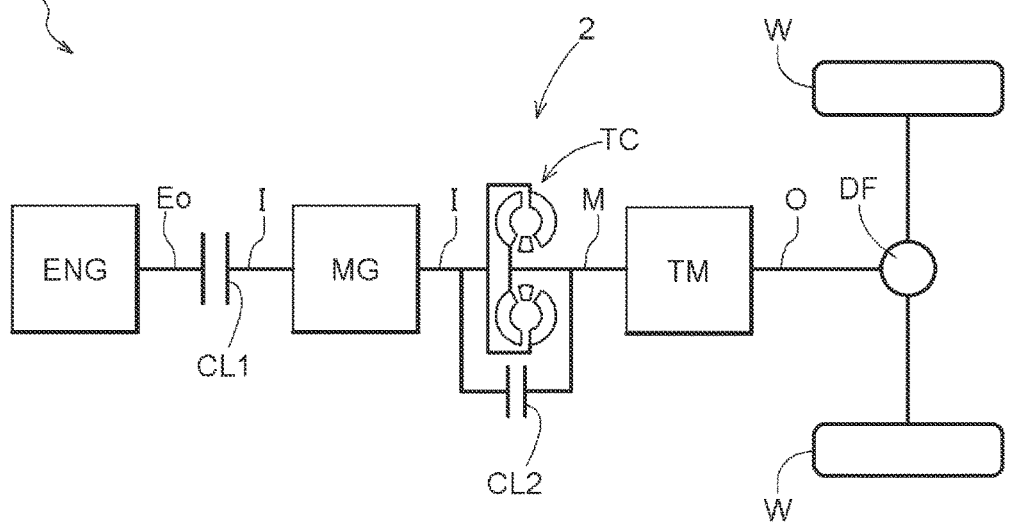
FIG. 8 is a schematic diagram illustrating a vehicle drive system according to another embodiment.

(1) In the example used to describe the above embodiment, one of multiple shifting engagement devices that the transmission TM includes is selected as the second engagement device CL2. Alternatively, an engagement device other than the shifting engagement devices (an engagement device that is provided in addition to the transmission TM) may be selected as the second engagement device CL2. For example, like in examples illustrated in FIG. 7 and FIG. 8, if another engagement device is provided in the power transfer path between the rotating electric machine MG and the transmission TM, the other engagement device may be selected as the second engagement device CL2. In the example illustrated in FIG. 7, the second engagement device CL2 is an engagement device for selectively coupling the input member I and an intermediate shaft M that serves as an input shaft of the transmission TM. In the example illustrated in FIG. 8, the second engagement device CL2 is a lock-up clutch (a direct clutch) for a torque convertor TC that is provided in the power transfer path between the rotating electric machine MG and the transmission TM. Even in the structures illustrated in FIG. 7 and FIG. 8, one of multiple shifting engagement devices that the transmission TM includes may be selected as the second engagement device CL2. Further, if the transmission TM is a dual clutch transmission called DCT, out of two engagement devices used for switching between two power transfer systems for an odd-numbered speed and an even-numbered speed, one engagement device presently being engaged may be selected as the second engagement device CL2.

(2) In the example used to describe the above embodiment, the drive control device 30 is structured to output the negative slip prohibitive signal to the vehicle control device 34 while having the possibility of prohibiting the negative slip control later as well as while prohibiting the negative slip control (i.e., while maintaining the rotational speed of the rotating electric machine MG at the rotational speed higher than the synchronous rotational speed under the condition where the required torque is the negative torque). Alternatively, the drive control device 30 may be structured to output the negative slip prohibitive signal to the vehicle control device 34 only while actually prohibiting the negative slip control (only while the required torque is the negative torque). Further, the drive control device 30 may be structured to output the negative slip prohibitive signal to the vehicle control device 34 only while maintaining the rotational speed of the rotating electric machine MG at the rotational speed higher than the synchronous rotational speed in response to the decrease in the accelerator operation amount. Furthermore, the drive control device 30 may be structured not to output the negative slip prohibitive signal to the vehicle control device 34.

(3) In the example used to describe the above embodiment, the drive control device 30 is structured to allow the positive slip control when the required torque changes from the negative torque to the positive torque during the performance of the slip control. Alternatively, the drive control device 30 may be structured to prohibit the positive slip control when the required torque changes from the negative torque to the positive torque during the performance of the slip control. In other words, the drive control device 30 may be structured to maintain the rotational speed of the rotating electric machine MG at any rotational speed lower than the synchronous rotational speed when the required torque changes from the negative torque to the positive torque during the performance of the slip control.

(4) In the example used to describe the above embodiment, both the first engagement device CL1 and the second engagement device CL2 are hydraulically driven friction engagement devices. Alternatively, one or both of the first engagement device CL and the second engagement device CL2 may be an engagement device controlled by any driving force other than a hydraulic pressure, such as a driving force by an electromagnet or a driving force by a servo motor.

(5) In the example used to describe the above embodiment, both the first engagement device CL and the second engagement device CL2 are normally-opened engagement devices having a transfer torque capacity (an engagement pressure) that decreases with decreasing hydraulic pressure (a hydraulic command) supplied thereto. Alternatively, one or both of the first engagement device CL1 and the second engagement device CL2 may be a normally-closed engagement device engaged by a spring pressure or the like and having a transfer torque capacity (an engagement pressure) that decreases with increasing hydraulic pressure (a hydraulic command) supplied thereto.

(6) In the example used to describe the above embodiment, each of the shift speeds is established by bringing any two of the multiple shifting engagement devices into the engagement state. Alternatively, each of the shift speeds may be established by bringing any three or more of the multiple shifting engagement devices into the engagement state.

(7) In the example used to describe the above embodiment, the transmission TM is structured to establish, as forward shift speeds, six shift speeds with different speed ratios. Alternatively, the number of forward shift speeds established by the transmission TM may be any number (e.g., "8") other than "6".

(8) The assignment of functional portions in the drive control device 30 described in the embodiments is just an example. Multiple functional portions may be combined, or a single functional portion may be subdivided.

(9) In addition, for other structures, the embodiments disclosed in the present specification should be considered in all aspect as illustrative. Thus, various modifications that fall within the spirit of the present disclosure will be apparent to those skilled in the art.

4. Summary of the Embodiments

The control device described above is summarized below.

A control device (30) is for controlling a vehicle drive system (2) in which a first engagement device (CL1), a rotating electric machine (MG), and a second engagement device (CL2) are provided in a power transfer path connecting an internal combustion engine (ENG) to wheels (W) and are arranged sequentially from the internal combustion engine (ENG) side. During start control that starts the internal combustion engine (ENG), the control device (30) performs slip control that controls the rotating electric machine (MG) to bring the second engagement device (CL2) into a slip engagement state and to maintain a state where there is a difference in rotational speed between a pair of engagement members of the second engagement device (CL2). A rotational speed of the rotating electric machine (MG) at which there is no difference in rotational speed between the pair of engagement members of the second engagement device (CL2) is defined as a synchronous rotational speed. The slip control maintains the rotational speed of the rotating electric machine (MG) at a rotational speed higher than a synchronous rotational speed when an accelerator operation amount decreases under a condition where the rotational speed of the rotating electric machine (MG) is higher than the synchronous rotational speed.

According to this structure, the slip control maintains the second engagement device (CL2) in the slip engagement state during the start control that starts the internal combustion engine (ENG). This makes it hard to transfer, to the wheels (W), fluctuation in output torque of the internal combustion engine (ENG) and torque fluctuation caused by a change in the state of engagement of the first engagement device (CL1), thus reducing shock associated with starting the internal combustion engine (ENG). In addition, according to the structure described above, when the accelerator operation amount decreases under the condition where the rotational speed of the rotating electric machine (MG) is higher than the synchronous rotational speed, the rotational speed of the rotating electric machine (MG) is maintained at the rotational speed higher than the synchronous rotational speed. Since there is an overall trend that a required torque that is a torque required to be transferred to the wheels (W) via the second engagement device (CL2) becomes smaller as the accelerator operation amount becomes smaller, the required torque may change from a positive torque to a negative torque when the accelerator operation amount decreases under the condition where the rotational speed of the rotating electric machine (MG) is higher than the synchronous rotational speed. Therefore, in contrast to the structure described above, in the case where the control for maintaining the rotational speed of the rotating electric machine (MG) at the rotational speed higher than the synchronous rotational speed is not performed when the accelerator operation amount decreases under the condition where the rotational speed of the rotating electric machine (MG) is higher than the synchronous rotational speed, if the required torque changes from the positive torque to the negative torque in response to the decrease in the accelerator operation amount, a transition occurs, in response to the change in the required torque, from a state where the rotational speed of the rotating electric machine (MG) is higher than the synchronous rotational speed to a state where the rotational speed of the rotating electric machine (MG) is lower than the synchronous rotational speed. Further, since a direction in which the second engagement device (CL2) transfers a torque is reversed at a time when a magnitude relationship between the rotational speed of the rotating electric machine (MG) and the synchronous rotational speed is reversed, shock corresponding to the transfer torque capacity of the second engagement device (CL2) at the time may occur. On the other hand, if the rotational speed of the rotating electric machine (MG) is maintained at the rotational speed higher than the synchronous rotational speed when the accelerator operation amount decreases under the condition where the rotational speed of the rotating electric machine (MG) is higher than the synchronous rotational speed, the direction in which the second engagement device (CL2) transfers a torque is not reversed. Consequently, no shock is caused by the reversal. Thus, the structure described above eliminates the need to stagger the timing of when the direction of the required torque required to be transferred to the wheels (W) is reversed and the timing of when the internal combustion engine (ENG) is started, thereby allowing the internal combustion engine to be started quickly. Further, at least when the required torque changes from the positive torque to the negative torque, this structure reduces shock that is transferred to the wheels (W) upon reversal of the direction of the required torque.

Further, the following is preferable: while maintaining the rotational speed of the rotating electric machine (MG) at the rotational speed higher than the synchronous rotational speed in response to a decrease in the accelerator operation amount, the control device outputs a signal to a vehicle control device (34) that controls torque sharing throughout a vehicle; and the signal commands that the rotational speed of the rotating electric machine (MG) be not lowered below the synchronous rotational speed.

This structure allows the vehicle control device (34) to control a braking force of a brake device for the wheels (W), a regenerative braking force of another rotating electric machine provided in addition to the rotating electric machine (MG), etc., thereby covering a shortage of the negative torque caused by not lowering the rotational speed of the rotating electric machine (MG) below the synchronous rotational speed. Thus, this structure suitably ensures a driver's feeling even when the rotational speed of the rotating electric machine (MG) is not lowered below the synchronous rotational speed.

Further, the following is preferable: a torque required to be transferred to the wheels (W) via the second engagement device (CL2) is defined as a required torque; and when the required torque is a negative torque at a point in time when the slip control is finished, a torque transferred to the wheels (W) via the second engagement device (CL2) is caused to gradually decrease with a predetermined decreasing gradient toward the required torque.

This structure facilitates reducing shock that may occur at the time when the slip control is finished, in comparison to causing a torque transferred to the wheels (W) via the second engagement device (CL2) to change to a negative required torque stepwise at the time when the slip control is finished.

Further, the following is preferable: a torque required to be transferred to the wheels (W) via the second engagement device (CL2) is defined as a required torque; an engagement pressure during standby prior to actual engagement that causes the second engagement device (CL2) to be engaged is defined as a standby pressure; and an engagement pressure of the second engagement device (CL2) is adjusted to the standby pressure when the required torque is a negative torque during a period of time where the rotational speed of the rotating electric machine (MG) is maintained at the rotational speed higher than the synchronous rotational speed in response to a decrease in the accelerator operation amount.

This structure improves responsiveness that brings the second engagement device (CL2) into direct engagement after the slip control is finished, in comparison to setting the engagement pressure of the second engagement device (CL2) to zero under the condition where the required torque is the negative torque while the rotational speed of the rotating electric machine (MG) is maintained at the rotational speed higher than the synchronous rotational speed in response to a decrease in the accelerator operation amount.

Further, the following is preferable: of the slip control, control that raises the rotational speed of the rotating electric machine (MG) above the synchronous rotational speed is defined as positive slip control; control that lowers the rotational speed of the rotating electric machine (MG) below the synchronous rotational speed is defined as negative slip control; in the slip control, according to whether a required torque that is a torque required to be transferred to the wheels (W) via the second engagement device (CL2) is positive or negative, when the required torque is a positive torque, the positive slip control is performed, and when the required torque is a negative torque, the negative slip control is performed; and when an accelerator operation amount decreases under a condition where the rotational speed of the rotating electric machine (MG) is higher than the synchronous rotational speed, the negative slip control is prohibited so that the rotational speed of the rotating electric machine (MG) is maintained at the rotational speed higher than the synchronous rotational speed.

In this structure, according to whether the required torque is positive or negative, the positive slip control transfers the positive torque to the wheels (W) when the required torque is the positive torque, and the negative slip control transfers the negative torque to the wheels (W) when the required torque is the negative torque. Thus, it is basically possible to transfer a torque corresponding to the required torque to the wheels (W) even during the start control of the internal combustion engine (ENG). In addition, when the accelerator operation amount decreases under the condition where the rotational speed of the rotating electric machine (MG) is higher than the synchronous rotational speed, the negative slip control is prohibited. Thus, even if the required torque changes from the positive torque to the negative torque, the rotational speed of the rotating electric machine (MG) is maintained at the rotational speed higher than the synchronous rotational speed.

Further, a control device (30) according to another embodiment is for controlling a vehicle drive system (2) in which a first engagement device (CL1), a rotating electric machine (MG), and a second engagement device (CL2) are provided in a power transfer path connecting an internal combustion engine (ENG) to wheels (W) and are arranged sequentially from the internal combustion engine (ENG) side. During start control that starts the internal combustion engine (ENG), the control device (30) performs slip control that controls the rotating electric machine (MG) to bring the second engagement device (CL2) into a slip engagement state and to maintain a state where there is a difference in rotational speed between a pair of engagement members of the second engagement device (CL2). A rotational speed of the rotating electric machine (MG) at which there is no difference in rotational speed between the pair of engagement members of the second engagement device (CL2) is defined as a synchronous rotational speed. When a required torque that is a torque required to be transferred to the wheels (W) via the second engagement device (CL2) is a positive torque, the slip control raises the rotational speed of the rotating electric machine (MG) above the synchronous rotational speed; and when the required torque changes from the positive torque to a negative torque, the slip control limits transfer of the negative torque to an input member (I) that drivingly couples the rotating electric machine (MG) and the second engagement device (CL2).

According to this structure, the slip control maintains the second engagement device (CL2) in the slip engagement state during the start control that starts the internal combustion engine (ENG). This makes it hard to transfer, to the wheels (W), fluctuation in output torque of the internal combustion engine (ENG) and torque fluctuation caused by a change in the state of engagement of the first engagement device (CL1), thus reducing shock associated with starting the internal combustion engine (ENG). Further, when the required torque is the positive torque during the start control of the internal combustion engine (ENG), it is possible to transfer the positive torque to the wheels by raising the rotational speed of the rotating electric machine (MG) above the synchronous rotational speed. In addition, when the required torque changes from the positive torque to the negative torque, the structure described above limits the transfer of the negative torque to the input member (I) that drivingly couples the rotating electric machine (MG) and the second engagement device (CL2). In contrast to this structure, if the negative torque is transferred to the input member (I) when the required torque changes from the positive torque to the negative torque, the rotational speed of the rotating electric machine (MG) that is drivingly coupled to the input member (I) may decrease, so that a transition may occur from a state where the rotational speed of the rotating electric machine (MG) is higher than the synchronous rotational speed to a state where the rotational speed of the rotating electric machine (MG) is lower than the synchronous rotational speed. If the rotational speed of the rotating electric machine becomes lower than the synchronous rotational speed, the direction in which the second engagement device (CL2) transfers a torque is reversed at a time when a magnitude relationship between the rotational speed of the rotating electric machine (MG) and the synchronous rotational speed is reversed. Consequently, shock corresponding to the transfer torque capacity of the second engagement device (CL2) at the time may occur. On the other hand, if the transfer of the negative torque to the input member (I) is limited when the required torque changes from the positive torque to the negative torque, the rotational speed of the rotating electric machine (MG) is maintained at the rotational speed higher than the synchronous rotational speed. As a result, a reversal of the direction in which the second engagement device (CL2) transfers a torque is avoided, and no shock is caused by the reversal. Thus, the structure described above eliminates the need to stagger the timing of when the direction of the required torque required to be transferred to the wheels (W) is reversed and the timing of when the internal combustion engine (ENG) is started, thereby allowing the internal combustion engine to be started quickly. Further, at least when the required torque changes from the positive torque to the negative torque, this structure reduces shock that is transferred to the wheels (W) upon reversal of the direction of the required torque.

Further, a control device (30) according to still another embodiment is for controlling a vehicle drive system (2) in which a first engagement device (CL1), a rotating electric machine (MG), and a second engagement device (CL2) are provided in a power transfer path connecting an internal combustion engine (ENG) to wheels (W) and are arranged sequentially from the internal combustion engine (ENG) side. During start control that starts the internal combustion engine (ENG), the control device (30) performs slip control that controls the rotating electric machine (MG) to bring the second engagement device (CL2) into a slip engagement state and to maintain a state where there is a difference in rotational speed between a pair of engagement members of the second engagement device (CL2). A rotational speed of the rotating electric machine (MG) at which there is no difference in rotational speed between the pair of engagement members of the second engagement device (CL2) is defined as a synchronous rotational speed. When a required torque that is a torque required to be transferred to the wheels (W) via the second engagement device (CL2) is a positive torque, the slip control raises the rotational speed of the rotating electric machine (MG) above the synchronous rotational speed; and when the required torque changes from the positive torque to a negative torque, the slip control maintains the rotational speed of the rotating electric machine (MG) at a rotational speed higher than the synchronous rotational speed.

According to this structure, the slip control maintains the second engagement device (CL2) in the slip engagement state during the start control that starts the internal combustion engine (ENG). This makes it hard to transfer, to the wheels (W), fluctuation in output torque of the internal combustion engine (ENG) and torque fluctuation caused by a change in the state of engagement of the first engagement device (CL1), thus reducing shock associated with starting the internal combustion engine (ENG). Further, when the required torque is the positive torque during the start control of the internal combustion engine (ENG), it is possible to transfer the positive torque to the wheels (W) by raising the rotational speed of the rotating electric machine (MG) above the synchronous rotational speed. In addition, according to the structure described above, when the required torque changes from the positive torque to the negative torque, the rotational speed of the rotating electric machine (MG) is maintained at the rotational speed higher than the synchronous rotational speed. In contrast to this structure, if the rotational speed of the rotating electric machine (MG) becomes lower than the synchronous rotational speed when the required torque changes from the positive torque to the negative torque, the direction in which the second engagement device (CL2) transfers a torque is reversed at a time when a magnitude relationship between the rotational speed of the rotating electric machine (MG) and the synchronous rotational speed is reversed. Consequently, shock corresponding to the transfer torque capacity of the second engagement device (CL2) at the time may occur. On the other hand, if the rotational speed of the rotating electric machine (MG) is maintained at the rotational speed higher than the synchronous rotational speed when the required torque changes from the positive torque to the negative torque, the direction in which the second engagement device (CL2) transfers a torque is not reversed. Consequently, no shock is caused by the reversal. Thus, the structure described above eliminates the need to stagger the timing of when the direction of the required torque required to be transferred to the wheels (W) is reversed and the timing of when the internal combustion engine (ENG) is started, thereby allowing the internal combustion engine to be started quickly. Further, at least when the required torque changes from the positive torque to the negative torque, this structure reduces shock that is transferred to the wheels (W) upon reversal of the direction of the required torque.

INDUSTRIAL APPLICABILITY

A technique according to the present disclosure is applicable to a control device for controlling a vehicle drive system in which a first engagement device, a rotating electric machine, and a second engagement device are provided in a power transfer path connecting an internal combustion engine to wheels and are arranged sequentially from the internal combustion engine side.

The invention claimed is:

1. A control device for controlling a vehicle drive system in which a first engagement device, a rotating electric machine, and a second engagement device are provided in a power transfer path connecting an internal combustion engine to wheels and are arranged sequentially from an internal combustion engine side, the control device comprising:
an electronic control unit that is configured to, during start control that starts the internal combustion engine, bring the second engagement device into a slip engagement state and perform slip control that controls the rotating electric machine to maintain a state where there is a difference in rotational speed between a pair of engagement members of the second engagement device, wherein:
a rotational speed of the rotating electric machine at which there is no difference in rotational speed between the pair of engagement members of the second engagement device is defined as a synchronous rotational speed, and
the electronic control unit performs the slip control to maintain the rotational speed of the rotating electric machine at a rotational speed higher than the synchronous rotational speed when an accelerator operation amount decreases under a condition where the rotational speed of the rotating electric machine is higher than the synchronous rotational speed.

2. The control device according to claim 1, wherein
while maintaining the rotational speed of the rotating electric machine at the rotational speed higher than the synchronous rotational speed in response to a decrease in the accelerator operation amount, the electronic control unit outputs a signal to a vehicle control device that controls torque sharing throughout a vehicle, the signal commanding that the rotational speed of the rotating electric machine be not lowered below the synchronous rotational speed.

3. The control device according to claim 1, wherein
a torque required to be transferred to the wheels via the second engagement device is defined as a required torque, and when the required torque is a negative torque at a point in time when the slip control is finished, the electronic control unit causes a torque transferred to the wheels via the second engagement device to gradually decrease with a predetermined decreasing gradient toward the required torque.

4. The control device according to claim 1, wherein
a torque required to be transferred to the wheels via the second engagement device is defined as a required torque,
an engagement pressure during standby prior to actual engagement that causes the second engagement device to be engaged is defined as a standby pressure, and
the electronic control unit adjusts an engagement pressure of the second engagement device to the standby pressure when the required torque is a negative torque during a period of time where the rotational speed of the rotating electric machine is maintained at the rotational speed higher than the synchronous rotational speed in response to a decrease in the accelerator operation amount.

5. The control device according to claim 1, wherein
of the slip control, control raising the rotational speed of the rotating electric machine above the synchronous rotational speed is defined as positive slip control, and control lowering the rotational speed of the rotating electric machine below the synchronous rotational speed is defined as negative slip control,
in the slip control, according to whether a required torque that is a torque required to be transferred to the wheels via the second engagement device is positive or negative, when the required torque is a positive torque, the electronic control unit performs the positive slip control, and when the required torque is a negative, the electronic control unit performs the negative slip control, and
when the accelerator operation amount decreases under the condition where the rotational speed of the rotating electric machine is higher than the synchronous rotational speed, the electronic control unit prohibits the negative slip control so that the rotational speed of the rotating electric machine is maintained at the rotational speed higher than the synchronous rotational speed.

6. A control device for controlling a vehicle drive system in which a first engagement device, a rotating electric machine, and a second engagement device are provided in a power transfer path connecting an internal combustion engine to wheels and are arranged sequentially from an internal combustion engine side, the control device comprising:
an electronic control unit that is configured to, during start control that starts the internal combustion engine, bring the second engagement device into a slip engagement state and perform slip control that controls the rotating electric machine to maintain a state where there is a difference in rotational speed between a pair of engagement members of the second engagement device, wherein:
a rotational speed of the rotating electric machine at which there is no difference in rotational speed between the pair of engagement members of the second engagement device is defined as a synchronous rotational speed,
when a required torque that is a torque required to be transferred to the wheels via the second engagement device is a positive torque, the electronic control unit performs the slip control to raise the rotational speed of the rotating electric machine above the synchronous rotational speed, and when the required torque changes from the positive torque to a negative torque, the electronic control unit performs the slip control to limit transfer of the negative torque to an input member that drivingly couples the rotating electric machine and the second engagement device.

7. A control device for controlling a vehicle drive system in which a first engagement device, a rotating electric machine, and a second engagement device are provided in a power transfer path connecting an internal combustion engine to wheels and are arranged sequentially from an internal combustion engine side, the control device comprising:

an electronic control unit that is configured to, during start control that starts the internal combustion engine, bring the second engagement device into a slip engagement state and perform slip control that controls the rotating electric machine to maintain a state where there is a difference in rotational speed between a pair of engagement members of the second engagement device, wherein:

a rotational speed of the rotating electric machine at which there is no difference in rotational speed between the pair of engagement members of the second engagement device is defined as a synchronous rotational speed, when a required torque that is a torque required to be transferred to the wheels via the second engagement device is a positive torque, the electronic control unit performs the slip control to raise the rotational speed of the rotating electric machine above the synchronous rotational speed, and when the required torque changes from the positive torque to a negative torque, the electronic control unit performs the slip control to maintain the rotational speed of the rotating electric machine at a rotational speed higher than the synchronous rotational speed.

* * * * *